United States Patent
Wang et al.

(10) Patent No.: US 10,866,124 B2
(45) Date of Patent: Dec. 15, 2020

(54) SYSTEMS AND METHODS FOR SPEED ESTIMATION OF CONTACTLESS ENCODER SYSTEMS

(71) Applicants: Mitsubishi Electric Research Laboratories, Inc., Cambridge, MA (US); Mitsubishi Electric Corporation, Tokyo (JP)

(72) Inventors: Pu Wang, Cambridge, MA (US); Philip Orlik, Cambridge, MA (US); Kota Sadamoto, Tokyo (JP); Wataru Tsujita, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 525 days.

(21) Appl. No.: 15/874,069

(22) Filed: Jan. 18, 2018

(65) Prior Publication Data
US 2019/0120662 A1    Apr. 25, 2019

Related U.S. Application Data

(60) Provisional application No. 62/576,133, filed on Oct. 24, 2017.

(51) Int. Cl.
*B66B 5/00* (2006.01)
*B66B 1/28* (2006.01)
(Continued)

(52) U.S. Cl.
CPC ............... *G01D 5/305* (2013.01); *B66B 1/28* (2013.01); *B66B 1/3492* (2013.01);
(Continued)

(58) Field of Classification Search
CPC .. B65B 37/04; B65D 88/66; B60G 2800/012; B66B 1/3492; B66B 1/30; B66B 5/04;
(Continued)

(56) References Cited

U.S. PATENT DOCUMENTS 5,896,949 A     4/1999  Hamdy et al.
7,994,470 B2    8/2011  Kusano
(Continued)

*Primary Examiner* — Marlon T Fletcher
(74) *Attorney, Agent, or Firm* — Gennadiy Vinokur; James McAleenan; Hinori Tsukamoto

(57) ABSTRACT

An encoder including an emitter to emit a waveform to a scene including a structure. A receiver to receive the waveform reflected from the scene and to measure phases of the received waveform for a period of time. A memory to store a signal model relating phase measurements of the received waveform with phase parameters, and to store a state model relating the phase parameters with a state of the encoder. Wherein the signal model includes a motion-induced polynomial phase signal (PPS) component and a sinusoidal frequency modulated (FM) component. Wherein the PPS component is a polynomial function of the phase parameters, and wherein the FM component is a sinusoidal function of the phase parameters. A processor to determine the phase parameters using non-linear mapping of the phase measurements on the signal model and to determine the state of the encoder by submitting the phase parameters into the state model.

20 Claims, 16 Drawing Sheets

(51) Int. Cl.
  *G01D 5/30* (2006.01)
  *B66B 1/34* (2006.01)
  *G01D 5/347* (2006.01)
  *G01D 5/244* (2006.01)
  *G01P 3/48* (2006.01)

(52) U.S. Cl.
  CPC ....... *B66B 5/0018* (2013.01); *G01D 5/24409* (2013.01); *G01D 5/24428* (2013.01); *G01D 5/34746* (2013.01); *G01P 3/48* (2013.01)

(58) Field of Classification Search
  CPC ........... B66B 7/044; B66B 1/28; B66B 1/285; B66B 5/0018; G01H 1/00
  See application file for complete search history.

(56) References Cited

U.S. PATENT DOCUMENTS

| | | |
|---|---|---|
| 2013/0015336 A1 | 1/2013 | Ohno et al. |
| 2016/0209247 A1 | 7/2016 | Nagura |
| 2018/0162686 A1* | 6/2018 | Wang .................... B66B 1/3492 |
| 2019/0120662 A1* | 4/2019 | Wang .................... B66B 1/3492 |
| 2019/0204120 A1* | 7/2019 | Wang ................ G01D 5/34715 |

* cited by examiner

SYSTEMS AND METHODS FOR SPEED ESTIMATION OF CONTACTLESS ENCODER SYSTEMS

FIELD

The present disclosure relates generally to contactless encoders, and more particularly to estimation of a relative state of the encoder with respect to a periodic structure.

BACKGROUND

Encoders, such as linear encoders, can be used in many fields of application when precise positioning and/or speed measurements are needed. For example, when a position of an element movable along a linear path, such as for a position of a machine component on a linear axis, i.e. drives or pivot arms, needs to be determined. The positions detected in this case can be used as position values for measuring purposes, or also for positioning components by way of a drive having a position control loop. Such linear position encoders are used in devices, such as robot arms, communications and hydraulic actuators.

The linear encoder can have a scale and a read head for scanning, which can be movable in relation to one another, along with a processor for regulating measurement operations for assigning a position value. The position value is recorded by the read head, to a scanning signal. Depending on application requirements and structural options of the linear encoder, either the read head can be stationary and the scaler is movable, or the scaler is fixedly positioned and the read head is moved in relation thereto.

The scanning of the scaler can be performed in a contactless manner, wherein a read head can have illuminating means, which irradiate a scaler. The accuracy of a position and/or speed depends on a resolution of the scaler, i.e., a space between elements of periodic structures of the scaler, which can be inadequate for some applications.

At least one application using encoders can be for determining positioning and/or speed measurements of an elevator car moving through a hoistway. For example, some needs may be during elevator installation or maintenance. Conventionally, an elevator technician or mechanic climbs on top of the cab and utilizes a hand-held tachometer to check the speed of the elevator during adjustment or testing. This technique typically requires the technician to hold the tachometer against one of the guide rails within the hoistway while simultaneously attempting to run the elevator using the top of car inspection box. While this technique does provide speed information, there are limitations.

Some of these limitations can include efficiency and accuracy of the speed measurement that are sometimes compromised because of the technician's capabilities for maintaining contact between the tachometer and the guide rail with one hand while operating the top of car inspection box with the other hand. Additionally, there are serious safety concerns any time that a technician is required to be on top of an elevator cab while the elevator car is moving through the hoistway.

U.S. Pat. No. 5,896,949 describes an elevator installation, in which the ride quality is actively controlled using a plurality of electromagnetic linear actuators. The active ride control system of U.S. Pat. No. 5,896,949 provides for an elevator car to travel along guide rails in a hoistway, wherein sensors mounted on the elevator car measure vibrations occurring transverse to the direction of travel. Signals from the sensors are inputted into a controller which computes the activation current required for each linear actuator to suppress the sensed vibrations. These activation currents are supplied to the linear actuators which actively dampen the vibrations and thereby the ride quality for passengers traveling within the car is enhanced. The controller comprises a position controller with position feedback, which is problematic for many reasons. For example, the position feedback controller is rather slow and the controller output is limited to a level to not cause overheating of the actuators. Further problems include that the output from the acceleration controller, is not restricted and thus produces large amplitude resonance forces at the actuators. Resulting in all closed loop controllers to become unstable if feedback gain is too high.

Accordingly, there is a need in the art to improve the accuracy of estimation of relative position and/or speed of an encoder with respect to the scaler.

SUMMARY

Embodiments of the present disclosure are directed to contactless encoders, and more particularly to estimation of a relative state of the encoder with respect to a periodic structure.

Embodiments of the present disclosure are based on recognition that a state of an encoder, or a relative position and speed of a read head of the encoder with respect to a structure of a scaler, can be inferred from phase measurements of a signal emitted by the encoder and reflected from the scaler. Specifically, the state of the encoder can be inferred from a change in a phase of the reflected signal. Such that, some embodiments of the present disclosure are based on the understanding the signal reflected from a scaler can be affected by the relative motion between the encoder and the scaler. However, through experimentation, we learned that understanding how that motion can affect the reflected signal is complicated. Specifically, the relative motion results in the phase of the reflected signal to be a polynomial function of time. For instance, an initial velocity is proportional to a first-order polynomial phase parameter and an acceleration is proportional to a second-order polynomial phase parameter. To that end, such a motion induces the phase measurement of the reflected signal to have a polynomial structure, wherein such a component of the reflected signal, is refer to herein as a polynomial phase signal (PPS).

Accordingly, at least one application the present disclosure can be applied to is estimating motion of the elevator car of the elevator system that includes a periodic structure on the guiderail (track) of the elevator system. Of course, other applications of the present disclosure are possible, including positioning systems for elevators and train systems, radar, sonar, communications, acoustics and optics. Regarding the elevator system example, when the elevator car is moving in a dynamic motion or time-varying acceleration, measurements can be modeled as a pure PPS with the phase parameter associated to the kinematic parameters of the elevator car. For instance, the initial velocity and acceleration are proportional to the phase parameters, respectively. Meanwhile, the sinusoidal FM component is induced by the reflected signal from the periodic structure. And the sinusoidal FM parameters are associated with the motion of the elevator car, or, equivalently, the PPS component, which gives rise to the coupled sinusoidal FM-PPS signal. Such that using the sinusoidal FM-PPS model can capture the coupling between a motion-induced polynomial phase signal (PPS) component and a sinusoidal frequency modulated (FM) component due to the periodic structure of the encoder. Specifically, the coupling can be introduced to express the sinusoidal FM frequency as a function of the PPS-related parameters.

Further, through experimentation in parameter estimation using the coupled sinusoidal FM-PPS model, that in order to infer the motion of targets, we discovered that the parameter estimation can be used under stringent conditions. For example, when the number of samples obtained is limited, i.e., the response time for outputting the target motion parameter is very short, the present disclosure of using the coupled sinusoidal FM-PPS model can improve estimation accuracy. This aspect of improving the estimation of accuracy is at least one issue we wanted to overcome, for example, due to the periodic structure, discovering an accurate signal model had been a challenge. Further, at least one benefit, among many benefits, includes using the coupled sinusoidal FM-PPS model which provides for an improved estimation accuracy in terms of a mean squared error. Thus, we learned the coupled sinusoidal FM-PPS model could be used for many applications based upon setting thresholds for a response time for outputting the PPS phase parameters specific to a threshold time period, and/or for a sinusoidal FM phase parameter specific to a threshold sinusoidal FM frequency amount.

Further, if a threshold is set for a response time for outputting the PPS phase parameters is under a predetermine threshold time period, and/or if another threshold is set for the sinusoidal FM phase parameter that has a sinusoidal FM frequency less than a predetermine threshold sinusoidal FM frequency, then an action can be taken according to the specific application. At least one action, by non-limiting example, taken can be controlling a motion of the elevator car or a conveying machine. By controlling the motion of the elevator car at a moment of time there is an indication of some event, i.e. potential abnormal operation due mechanical related issues or environmental conditions effecting current operation, such controlling action may provide for extending the operational health of the elevator system or improve safety of contents, i.e., people, in the elevator car. The present disclosure overcomes parameter estimation such as motion of an elevator of polynomial phase signals (PPSs) having only a finite or small number of samples, which is a fundamental problem in conventional applications, including radar, sonar, communications, acoustics and optics. Specifically, we learned that the present disclosure coupled sinusoidal FM-PPS model overcomes such short comings, and despite a limited number of samples, outperforms by providing an improved estimation accuracy of the speed of the elevator car.

We also realized based on our experimentation, the importance of understanding the sinusoidal FM component when estimating motion of the elevator car, i.e. conveying machine, when certain circumstances or scenarios arise. For example, when a series of uniformly spaced reflectors are placed on the guiderail, the sinusoidal FM component is induced from the periodic structure. And the sinusoidal FM parameters are associated with the motion of the elevator car, or, equivalently, the PPS component, which gives rise to the coupled sinusoidal FM-PPS signal. The spatially periodic reflectors can affect the phase measurements of the reflected signal in a sinusoidal manner. Such a periodic component of the reflected signal induces phase change in a sinusoidal manner, in which, we refer to herein, as the motion-related sinusoidal frequency modulated (FM) signal. The sinusoidal phase change of the signal phase depends on the resolution scaler and the motion of the encoder.

In such a manner, the reflected signal is a combination of a polynomial phase signal and a frequency modulated signal. The reflected signal includes the PPS component and the FM component. On one hand, annotating periodic phase change with polynomial change can increase the accuracy of the state estimation. On the other hand, if those two components of the reflected signal are treated independently from each other, one signal component becomes the noise or interference to another signal component, which makes the increase of the accuracy of the encoder problematic.

However, some embodiments are based on realization that in a situation with the motion along a scene having a periodic structure, the PPS component and FM component may be coupled. Indeed, the same motion along the period structures effects the phase parameters of the PPS component, and the fundamental frequency of the FM component. The PPS component can be a polynomial function of the phase parameters, while the FM component can be the sinusoidal function of the same phase parameters. Because the phase parameters are part of both components, it is possible to increase the accuracy of determination of the phase parameters. Knowing the phase parameters, the state of the encoder can be readily recovered.

For example, some embodiments of the present disclosure are also based on the recognition that the fundamental frequency of the sinusoidal function of the FM component can be a coupling function of the polynomial phase parameters of the PPS component. The coupling function can be a linear or non-linear function. For example, in one embodiment, the coupling function is a linear scaling function. On the other hand, the non-linear coupling function can be induced if the structure, e.g., the spatially reflectors, is not uniformly distributed on the scale.

Wherein some embodiments use of a signal model relating phase measurements of the reflected waveform with phase parameters, and use a state model relating the phase parameters with a state of the encoder including one or combination of a relative velocity of the encoder with respect to a periodic structure of a scaler and a relative position of the encoder with respect to the periodic structure. The signal and state models can be used independently or merged together as one model. The signal model includes a motion-induced polynomial phase signal (PPS) component and a sinusoidal frequency modulated (FM) component. The PPS component is a polynomial function of the phase parameters, and the FM component is a sinusoidal function of the phase parameters. Because the phase parameters are part of both components, it is possible to increase the accuracy of determination of the phase parameters. Knowing the phase parameters, the state of the encoder can be readily recovered.

Other embodiments, however, can be based on another realization that coupling between components of the reflected signal complicates the recovery of the phase parameters. Another realization of the present disclosure is that the dependency on the FM component can introduce non-linearity in the solution. Wherein it is possible to determine the phase parameters using non-linear mapping of the phase measurements. For example, one embodiment unwraps the phase measurements and fits the unwrapped phase measurements on the signal model using a coupled nonlinear/linear least square method. In other words, the phase unwrapping least square (PULS) method which first unwraps the instantaneous phase (IP) of the sampled signal obtained, can then use the least square approach to fit the unwrapped IP to recover the PPS phase parameters and, therefore, the motion of the encoder.

Another embodiment determines frequencies of the phase measurements and fits the determined frequencies on the signal model using a coupled nonlinear/linear least square method with reduced dimension. In other words, the time-frequency least square (TFLS) method which obtains the instantaneous frequency (IF, i.e., the first derivative of the phase with respect to the time), and then use the nonlinear least square approach to fit the extracted IF for the estimation of the motion-related PPS phase parameters. After the phase parameters are estimated, some embodiments determine the state of the encoder by submitting the phase parameters into the state model.

Further, some embodiments can include estimating motion of the elevator car or a conveying machine, that measures a first direction of motion such as speed, and for controlling the operation of the elevator system or the conveying machine.

According to an embodiment of the present disclosure, an encoder including an emitter to emit a waveform to a scene including a structure with a surface varying according to a pattern. A receiver to receive the waveform reflected from the scene and to measure phases of the received waveform for a period of time. A memory to store a signal model relating phase measurements of the received waveform with phase parameters, and to store a state model relating the phase parameters with a state of the encoder. Wherein the state includes one or combination of a relative velocity of the encoder with respect to the structure and a relative position of the encoder with respect to the structure. Wherein the signal model includes a motion-induced polynomial phase signal (PPS) component and a sinusoidal frequency modulated (FM) component. Wherein the PPS component is a polynomial function of the phase parameters, and wherein the FM component is a sinusoidal function of the phase parameters. A processor to determine the phase parameters using non-linear mapping of the phase measurements on the signal model and to determine the state of the encoder by submitting the phase parameters into the state model. An output interface to render the state of the encoder.

According to an embodiment of the present disclosure, a conveying machine method including acquiring a reflected waveform for a period of time, by an input interface. Wherein the waveform is transmitted from at least one sensor to a structure having reflectors with an inter-reflector spacing varying according to the pattern, and the acquired reflected waveform includes phases to be measured for the period of time. Using a computer readable memory having stored thereon, a signal model relating phase measurements of the received waveform with phase parameters, and a stored state model relating the phase parameters with a state of the conveying machine. Wherein the state includes one or combination of a relative velocity of the conveying machine with respect to the structure and a relative position of the conveying machine with respect to the structure. Wherein the signal model includes a motion-induced polynomial phase signal (PPS) component and a sinusoidal frequency modulated (FM) component, and the PPS component is a polynomial function of the phase parameters, and the FM component is a sinusoidal function of the phase parameters. Using a processor in communication with the input interface and the computer readable memory, configured to determine the phase parameters using non-linear mapping of the phase measurements on the signal model and to determine the state of the conveying machine by submitting the phase parameters into the state model. Outputting the state of the conveying machine via an output interface in communication with the processor.

According to another embodiment of the present disclosure, an elevator system including an elevator car to move along a first direction. A transmitter for transmitting a signal having a waveform, to reflectors located along a structure of the elevator system, such that the reflectors include an inter-reflector spacing varying according to the pattern. A receiver for receiving the waveform reflected from the reflectors and to measure phases of the received waveform for a period of time. Wherein the receiver and the transmitter are arranged such that motion of the elevator car effects the received waveform. A computer readable memory to store a signal model relating phase measurements of the received waveform with phase parameters, and to store a state model relating the phase parameters with a state of the elevator car. Wherein the state includes one or combination of a relative velocity of the elevator car with respect to the structure and a relative position of the elevator car with respect to the structure. Wherein the signal model includes a motion-induced polynomial phase signal (PPS) component and a sinusoidal frequency modulated (FM) component. Wherein the PPS component is a polynomial function of the phase parameters, and wherein the FM component is a sinusoidal function of the phase parameters. A processor in communication with the transmitter, the receiver and the computer readable memory, to determine the phase parameters using non-linear mapping of the phase measurements on the signal model and to determine the state of the elevator car by submitting the phase parameters into the state model. A controller in communication with the processor, receives the state of the elevator car from the processor, to control an operation of the elevator system using the speed and position of the elevator car and the state of the elevator car, to assist in an operational health management of the elevator system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A is a block diagram illustrating the steps of the method of FIG. 1A in further detail including equations used for some of the steps, according to embodiments of the present disclosure;

FIG. 2B is a block diagram illustrating the step of collecting sensor measurements over a time interval along with a graph, and the step of extracting unwrapped phase information of the method of FIG. 2A according to the coupled sinusoidal FM-PPS signal model, according to an embodiment of the present disclosure;

FIG. 2C is a graph illustrating a moving distance per sample over a time interval (i.e., a time window), translated from the extracted unwrapped phase information of FIG. 2B, which clearly shows the coupling of two components: first, the straight line which is a polynomial function over time (i.e., the x-axis), and second, an oscillating component that is a sinusoidal FM component. The combination of both components gives the coupled sinusoidal FM-PPS component whose phase is shown in the blue curve.

FIG. 2D is a block diagram illustrating some steps of the method of FIG. 2A, including the step of coupling least squares estimation, the step of estimating other parameters and output motion parameters, along with equations for some of the steps, according to embodiments of the present disclosure;

FIG. 3A is a block diagram illustrating some steps of the method of FIG. 1B in further detail including equations used for some of the steps, according to embodiments of the present disclosure;

FIG. 3B is a block diagram illustrating some steps of the method of FIG. 2B, including the step of computing the time-frequency distributions, the step of extracting the peak location, the step of the coupling least squares estimation, the step of estimating other parameters and output motion parameters, along with equations for some of the steps, according to embodiments of the present disclosure;

FIG. 3C is a graph illustrating the spectrogram, i.e., the squared magnitude of the STFT, of the signal shown in FIG. 3B over a time interval (i.e., a time window);

FIG. 3D is a block diagram illustrating some steps of the method of FIG. 3A, including the step of extracting peak locations, the step of coupling least squares estimation, the step of estimating other parameters and the step of outputting motion parameters, along with equations for some of the steps, according to embodiments of the present disclosure;

Figure 1A:
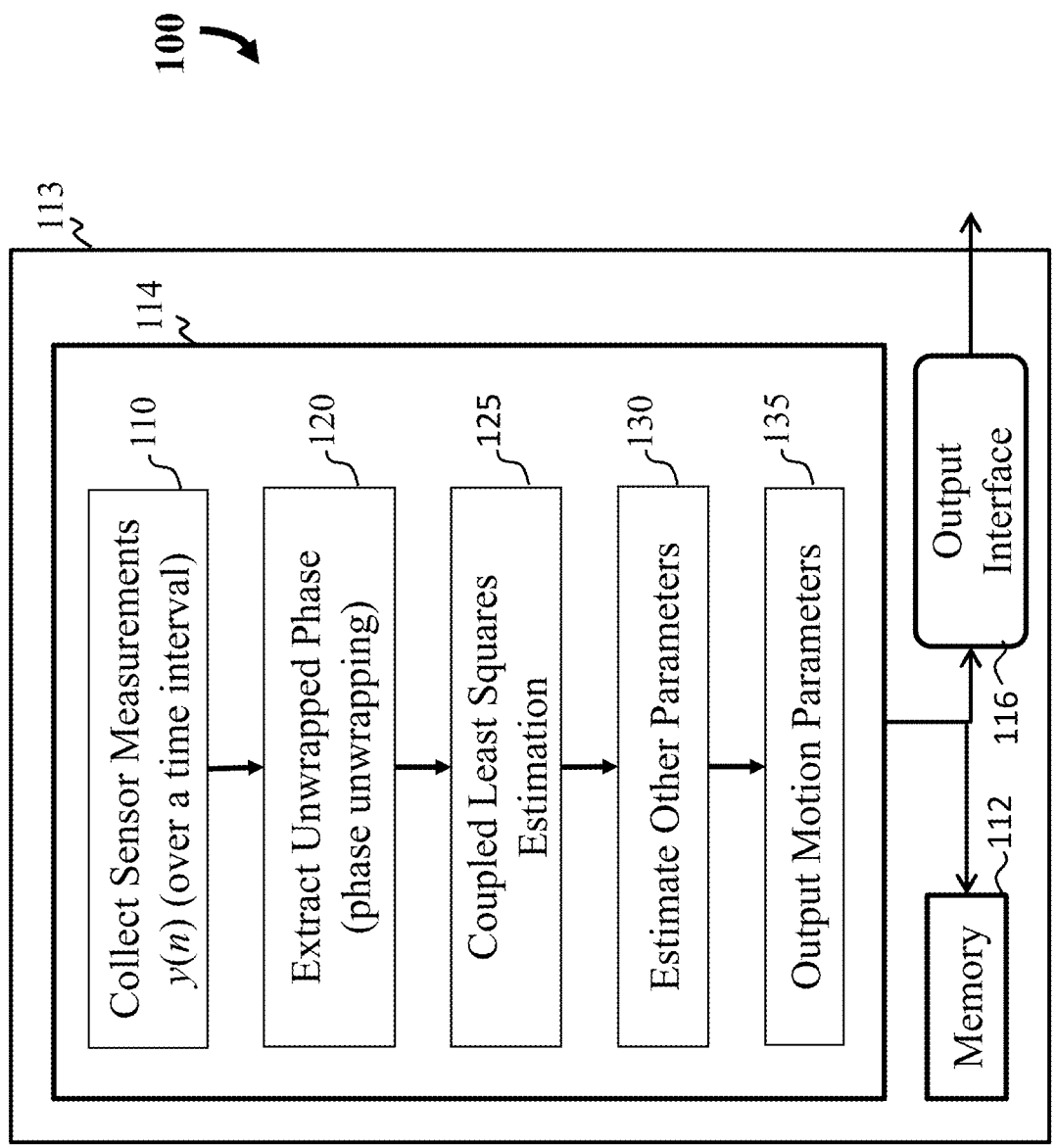
FIG. 1A is a block diagram illustrating a method to determine phase parameters using non-linear mapping of phase measurements on a signal model and to determine a state of an encoder by submitting the phase parameters into the state model, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure are directed to contactless encoders, and more particularly to estimation of a relative state of the encoder with respect to a periodic structure.

Some embodiments are based on the recognition that a state of an encoder, or a relative position and speed of a read head of the encoder with respect to a structure of a scaler, can be inferred from phase measurements of a signal emitted by the encoder and reflected from the scaler. In particular, the state of the encoder can be inferred from a change in the phase of the reflected signal, wherein the signal reflected from a scaler can be affected by the relative motion between the encoder and the scaler. However, through experimentation, we learned understanding how that motion can affect the reflected signal is complicated. Specifically, the relative motion results in the phase of the reflected signal to be a polynomial function of time. For instance, an initial velocity is proportional to a first-order polynomial phase parameter and an acceleration is proportional to a second-order polynomial phase parameter. To that end, such a motion induces the phase measurement of the reflected signal to have a polynomial structure, wherein such a component of the reflected signal, we refer to herein as a polynomial phase signal (PPS).

Accordingly, at least one application the present disclosure can be applied to is estimating motion of the elevator car of the elevator system that includes a periodic structure in the guiderail (track) of the elevator system, among other different types of applications. For example, when the elevator car is moving in a dynamic motion or time-varying acceleration, measurements can be modeled as a pure PPS with the phase parameter associated to the kinematic parameters of the elevator car. The initial velocity and acceleration are proportional to the phase parameters, respectively. Meanwhile, the sinusoidal FM component can be induced by the reflected signal from the periodic structure, and the sinusoidal FM parameters can be associated with the motion of the elevator car (i.e. or, equivalently, the PPS component), which gives rise to the coupled sinusoidal FM-PPS signal.

Some embodiments of the present disclosure are based on the realization that in a situation with the motion along a scene having a periodic structure, the PPS component and FM component may be coupled. Indeed, the same motion along the period structures effects the phase parameters of the PPS component, and the fundamental frequency of the FM component. The PPS component can be a polynomial function of the phase parameters, while the FM component can be the sinusoidal function of the same phase parameters. Because the phase parameters are part of both components, it is possible to increase the accuracy of determination of the phase parameters. Knowing the phase parameters, the state of the encoder can be readily recovered.

For example, some embodiments of the present disclosure are also based on the recognition that the fundamental frequency of the sinusoidal function of the FM component can be a coupling function of the polynomial phase parameters of the PPS component. The coupling function can be a linear or non-linear function. For example, in one embodiment, the coupling function is a linear scaling function. On the other hand, the non-linear coupling function can be induced if the structure, e.g., the spatially reflectors, is not uniformly distributed on the scale.

Wherein some embodiments use a signal model relating phase measurements of the reflected waveform with phase parameters, and use a state model relating the phase parameters with a state of the encoder including one or combination of a relative velocity of the encoder with respect to a periodic structure of a scaler and a relative position of the encoder with respect to the periodic structure. The signal and state models can be used independently or merged together as one model. The signal model includes a motion-induced polynomial phase signal (PPS) component and a sinusoidal frequency modulated (FM) component. The PPS component is a polynomial function of the phase parameters, and the FM component is a sinusoidal function of the phase parameters. Because the phase parameters are part of both components, it is possible to increase the accuracy of determination of the phase parameters. Knowing the phase parameters, the state of the encoder can be readily recovered (such that the independent FM component from vibration can be ignored).

Other embodiments, however, can be based on another realization that coupling between components of the reflected signal complicates the recovery of the phase parameters. Another realization of the present disclosure is that the dependency on the FM component can introduce non-linearity in the solution. Wherein it is possible to determine the phase parameters using non-linear mapping of the phase measurements. One embodiment includes unwrapping the phase measurements and fitting the unwrapped phase measurements on the signal model using a coupled nonlinear/linear least square method. Another embodiment determines frequencies of the phase measurements and fits the determined frequencies on the signal model using a coupled nonlinear/linear least square method with reduced dimension. After the phase parameters are estimated, some embodiments determine the state of the encoder by submitting the phase parameters into the state model.

Further, some embodiments can include estimating motion of the elevator car or a conveying machine, that measures a first direction of motion such as speed, and the state of the periodic reflectors, for controlling the operation of the elevator system or the conveying machine.

FIG. 1A is a block diagram illustrating a method to determine phase parameters using non-linear mapping of phase measurements on a signal model and to determine a state of an encoder by submitting the phase parameters into the state model, according to an embodiment of the present disclosure. The method 100 of FIG. 1A can include a computer 113 having a processor 114, a memory 112 and an output interface 116.

Step 110 of FIG. 1A, includes collecting or acquiring signal data generated by sensors, i.e. transmitter(s) and receiver(s), relating to motion of a movement of a structure in a first direction over a time interval, i.e. y(n), wherein "y" is the sampled signal and "n" is the sampling time index. The signal data can be stored in the memory 112, or the signal data can be gathered and processed in real-time, depending upon the requirements of the particular application requested by a user.

Step 120 of FIG. 1A, includes the step of unwrapping the phase of the sampled signal from the step 110. The present disclosure can use an approach of unwrapping the phase measurements and fitting the unwrapped phase measurements on the signal model using a coupled nonlinear/linear least square method. Wherein, the phase unwrapping least square (PULS) method unwraps the instantaneous phase (IP) of the sampled signal obtained.

Step 125 of FIG. 1A includes estimating the parameters of the sampled signal from the step 110, according to the coupled sinusoidal FM-PPS signal model. The parameters include the polynomial phase signal (PPS) phase parameters representing the speed of the elevator car along the first direction and the amplitude parameter representing the reflection strength from the reflectors. Further, after unwrapping the instantaneous phase (IP) of the sampled signal is obtained via the PULS method, the present disclosure can use a least square approach to fit the unwrapped IP to recover the PPS phase parameters and, therefore, the motion of the encoder (see FIGS. 2A-2D for more information).

Step 130 of FIG. 1A outputs other parameters including the amplitude, the sinusoidal FM index, and initial phase parameters. These other parameters can be obtained by using equation 230D1 of FIG. 2D.

Step 135 includes outputting the motion parameters by converting the above estimated phase parameters to the motion parameters, i.e., initial velocity and acceleration. For example, the first-order and second-order phase parameters can be converted to, respectively, the initial velocity and acceleration of the cage using equation 235D1 in FIG. 2D. Then these motion parameters can be used via a controller to control an operation of the elevator system using the speed of the elevator car, so as to assist in an operational health management of the elevator system.

Figure 1B:
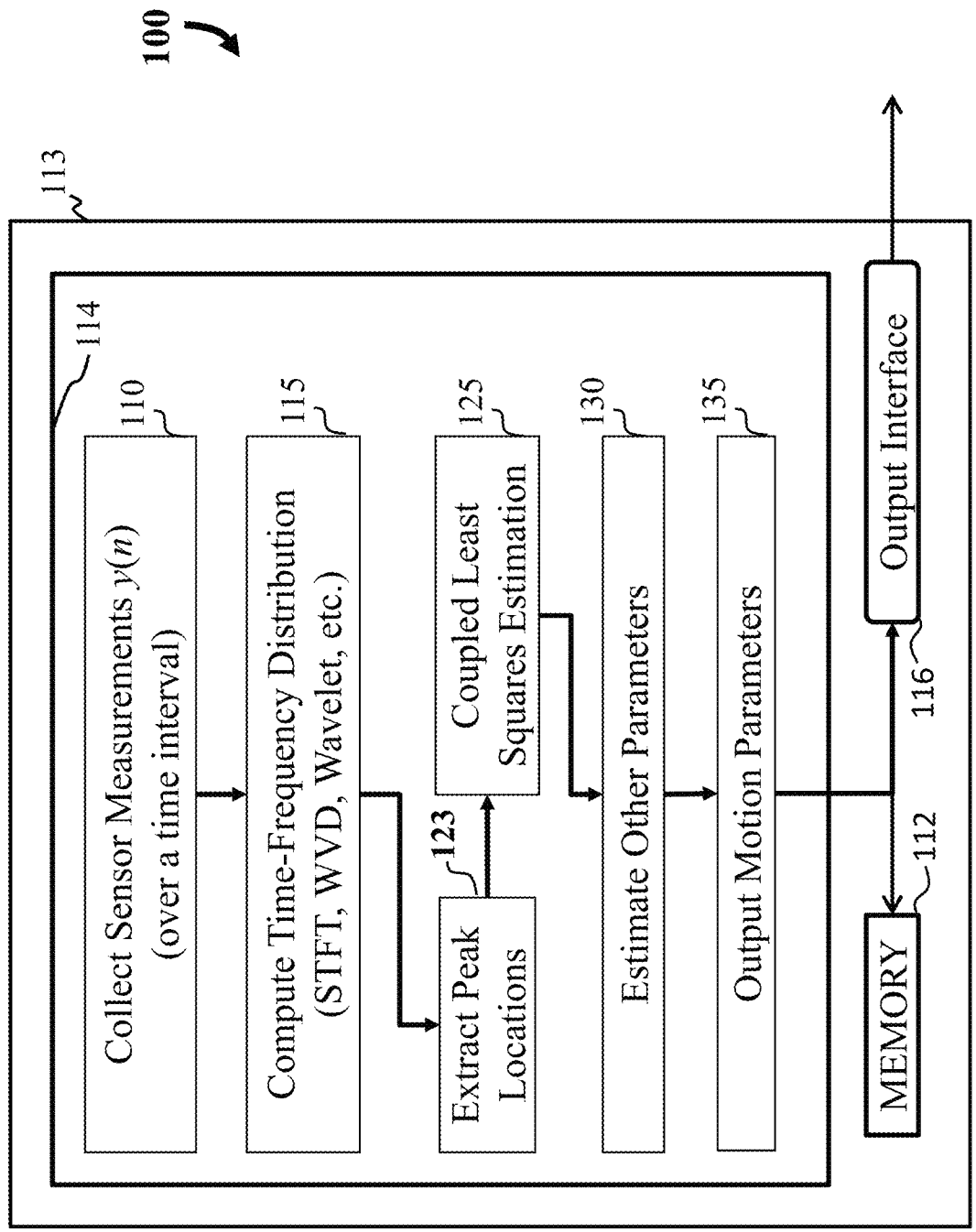
FIG. 1B is a block diagram illustrating a method to determine phase parameters using non-linear mapping of frequency measurements on a signal model and to determine a state of an encoder by submitting the phase parameters into the state model, according to an embodiment of the present disclosure.
Figure 1C:
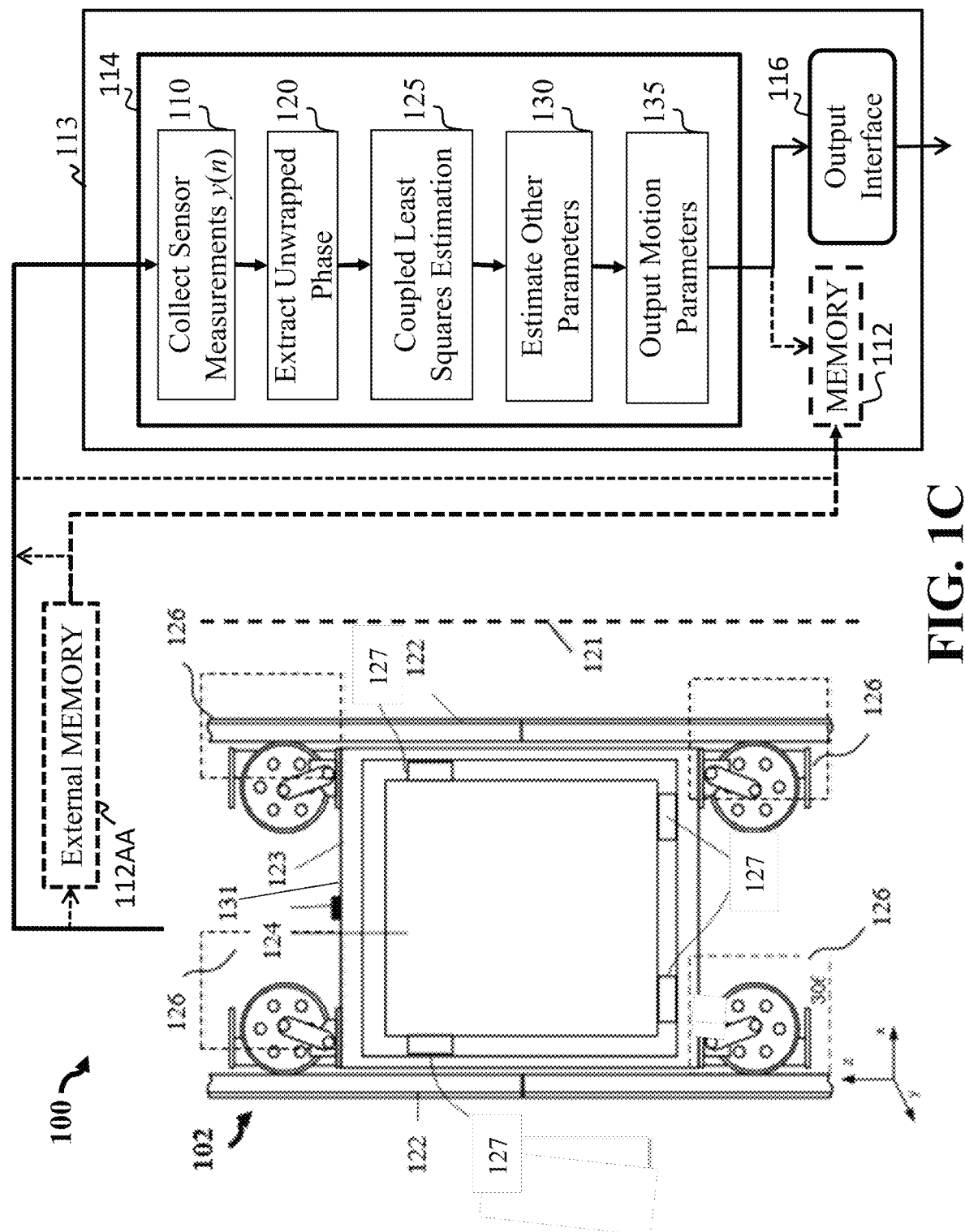
FIG. 1C is a schematic of an elevator system having a computer with a processor showing the methods steps of FIG. 1A in a block diagram, according to embodiments of the present disclosure.

Referring to FIG. 1A and FIG. 1C, at least one advantage in parameter estimation using the coupled sinusoidal FM-PPS model to infer motion of targets, is that parameter estimation can be used under stringent conditions. For example, when a sinusoidal FM frequency is small, i.e. having a low sinusoidal frequency, and/or when a number of samples obtained is limited, i.e., the response time for outputting the target motion parameter is very short, the present disclosure of using the coupled sinusoidal FM-PPS model can improve estimation accuracy. This aspect of improving the estimation of accuracy is at least one issue we wanted to overcome, for example, due to the coupling between the periodic structure and the relative motion, discovering an accurate signal model had been a challenge. Further, at least one benefit, among many benefits, includes using the coupled sinusoidal FM-PPS model which provides for an improved estimation accuracy in terms of a mean squared error for several orders of magnitude. Thus, we learned the coupled sinusoidal FM-PPS model could be used for many applications based upon setting thresholds for a response time for outputting the PPS phase parameters specific to a threshold time period, and/or for a sinusoidal FM phase parameter specific to a threshold sinusoidal FM frequency amount.

For example, if a threshold is set for a response time for outputting the PPS phase parameters is under a predetermine threshold time period, and/or if another threshold is set for the sinusoidal FM phase parameter that has a sinusoidal FM frequency less than a predetermine threshold sinusoidal FM frequency, then an action can be taken according to the specific application. At least one action, may include taking control of a motion of a conveying machine, or a motion of an elevator car 124 of an elevator system 102 of FIG. 1C. By controlling the motion of the conveying machine or elevator car 124 of FIG. 1C, at a moment of time, there is an indication of some event, i.e. potential abnormal operation due mechanical related issues or environmental conditions effecting current operation, such controlling action may provide for extending the operational health of the conveying machine or elevator car 124 of the elevator system 102 of FIG. 1C, or improve safety of contents, i.e., people, in the elevator car 124. The present disclosure overcomes parameter estimation such as motion of the conveying machine or the elevator car 124 using polynomial phase signals (PPSs) having only a finite or small number of samples, which overcomes a fundamental conventional problem in conventional applications, including radar, sonar, communications, acoustics and optics. Specifically, we learned that the coupled sinusoidal FM-PPS model of the present disclosure overcomes such short comings, and despite a small sinusoidal FM frequency and/or limited number of samples, out performs by providing an improved estimation accuracy of the speed of the conveying machine or the elevator car 124 of FIG. 1C.

Still referring to FIG. 1A and FIG. 1C, we also realized based on our experimentation, the importance of understanding the sinusoidal FM component when estimating motion of the conveying machine or elevator car 124 of FIG. 1C, when certain circumstances or scenarios arise. For example, when a series of uniformly spaced reflectors are placed on the structure of the conveying machine or a guiderail 122 of the elevator car 124 of FIG. 1C, the sinusoidal FM component is induced from the periodic structure. And the sinusoidal FM parameters are associated with the motion of the conveying machine or the elevator car the elevator car 124 of FIG. 1C, or, equivalently, the PPS component, which gives rise to the coupled sinusoidal FM-PPS signal. The spatially periodic reflectors can affect the phase measurements of the reflected signal in a sinusoidal manner. Such a periodic component of the reflected signal induces phase change in a sinusoidal manner, in which, we refer to herein, as the motion-related sinusoidal frequency modulated (FM) signal. The sinusoidal phase change of the signal phase depends on the resolution scaler and the motion of the encoder.

In such a manner, the reflected signal is a combination of a polynomial phase signal and a frequency modulated signal. The reflected signal includes the PPS component and the FM component. On one hand, annotating periodic phase change with polynomial change can increase the accuracy of the state estimation. On the other hand, if those two components of the reflected signal are treated independently from each other, one signal component becomes the noise or interference to another signal component, which makes the increase of the accuracy of the encoder problematic.

FIG. 1B is a block diagram illustrating the method of FIG. 1A that includes step 115 of computing time-frequency distribution (STFT, WVD and Wavelet) and step 123 of extracting peak locations, according to embodiments of the present disclosure. Specifically, computing the time-frequency distribution of the received waveform, extracting the peak locations for the instantaneous frequency, and using the coupled least squares method to estimate the motion-related parameters based on the coupled sinusoidal FM-PPS model. The step 123 of extracting peak locations is a procedure to locate the frequency index corresponding to a peak in the time-frequency distribution for a given time index. This procedure repeats over different time indices, outputting a series of frequency indices.

FIG. 1C is a schematic of an elevator system having a computer with a processor showing the methods steps of FIG. 1A in a block diagram, according to embodiments of the present disclosure. FIG. 1C shows an elevator system 102 including an elevator car 124, a frame 123, four roller guide assemblies 126, and guide rails 122. The roller guides assemblies 126 act as a suspension system to minimize the vibration of the elevator car 124. The elevator car 124 and roller guide assemblies 126 are mounted on the frame 122. The elevator car 124 and frame 123 move along the guide rail 122 as constrained by the guide rollers assemblies 126.

FIG. 1C illustrates how the signal data of step 110 of FIG. 1A can be collected from the elevator system 102. The elevator system 102 includes an elevator car 124 that moves along a first direction (z-axis). Sensors 131 can be used, wherein a transmitter can transmit a signal having a waveform, and a receiver can receive the waveform. Depending upon the application a sensor 131 may be located on the elevator car 124 and another sensor may be located on the frame 122 of the elevator system 102 or some other location. The present disclosure contemplates using different types of sensors as well as sensor locations, as noted above, within the elevator system 102 to obtain the signal data. The receiver and the transmitter are arranged such that motion of the elevator car 124 effects the received waveform. The signal data can be gathered and processed in real-time via the processor 114, depending upon the requirements of the particular application requested. The signal data may be optionally stored in an external memory 112AA and processed by processor 114 or stored in memory 112, or stored directly to memory 112 and then processed by the processor 114.

Still referring to FIG. 1C, for example, implementing a method of the present disclosure can include an initial step of the elevator system 102 having the elevator car 124 move in a first direction. A transmitter 131A of FIG. 1F may be used for transmitting a signal having a waveform. A receiver 131B of FIG. 1F may be used for receiving the waveform, wherein the receiver 131B of FIG. 1F and the transmitter 131A of FIG. 1F are arranged such that motion of the elevator car 124 effects the received waveform. Signal data is generated by the sensors 131, i.e. transmitter 131A of FIG. 1F and receiver 131B of FIG. 1F, relating to the motion of a movement of an elevator car 124 of the elevator system 102 in the first direction. The signal data can be stored in memory 112 (or external memory 112AA), or the signal data can be gathered and processed in real-time, depending upon the requirements of the particular application requested.

A processor 114 can have an internal memory 112 and acquires the signal data when the signal data is stored in memory 112, or the processor 114 can acquire the signal data in real time and not from the internal memory 112. The processor 114 can be configured to represent the received waveform as a coupled sinusoidal frequency modulated (FM)-polynomial phase signal (PPS) model. The coupled sinusoidal FM-PPS model has PPS phase parameters representing a speed of the elevator car 124 along a first direction and a sinusoidal FM phase parameter representing the presence of the structurally placed reflectors 134 of FIG. 1E on the guiderail 122, and then solves the coupled sinusoidal FM-PPS model to produce one or combination of the speed of the elevator car 124 of the elevator system 102.

Remember, when the elevator car 124 is moving in a dynamic motion or time-varying acceleration, measurements can be modeled as a pure PPS with the phase parameter associated to the kinematic parameters of the elevator car 124, i.e. the initial velocity and acceleration are proportional to the phase parameters, respectively. We also realized the importance of the sinusoidal FM component when estimating motion of the elevator car 124, can be further enhanced by simultaneously estimating the sinusoidal FM parameters due to the coupling effect.

We can solve for the coupled sinusoidal FM-PPS model using several approaches, at least two approaches includes using the PPS phase parameters and the sinusoidal FM phase parameter by: 1) unwrapping the phase of the received signal and using the coupled least squares method to estimate the motion-related parameters based on the coupled sinusoidal FM-PPS model; and 2) computing the time-frequency distribution of the received waveform, extracting the peak locations for the instantaneous frequency, using the coupled least squares method to estimate the motion-related parameters based on the coupled sinusoidal FM-PPS model.

Finally, a controller may be used to control an operation of the elevator system using one or combination of the speed of the elevator car or the state of the structure, so as to assist in an operational health management of the elevator system.

It is noted that the conveying system may include applications involving transportation of people, heavy or bulky materials and the like. For example, the conveyor system can include an ability to detect motion of at least one part of the conveyor system wherein the moving part of the conveyor system, i.e. target, introduces a pure PPS component with kinematic parameters related to PPS phase parameters, along with rotating parts (e.g., rotating blades of a helicopter) and target vibration (e.g., jet engine) that introduce a sinusoidal FM component.

Figure 1D:
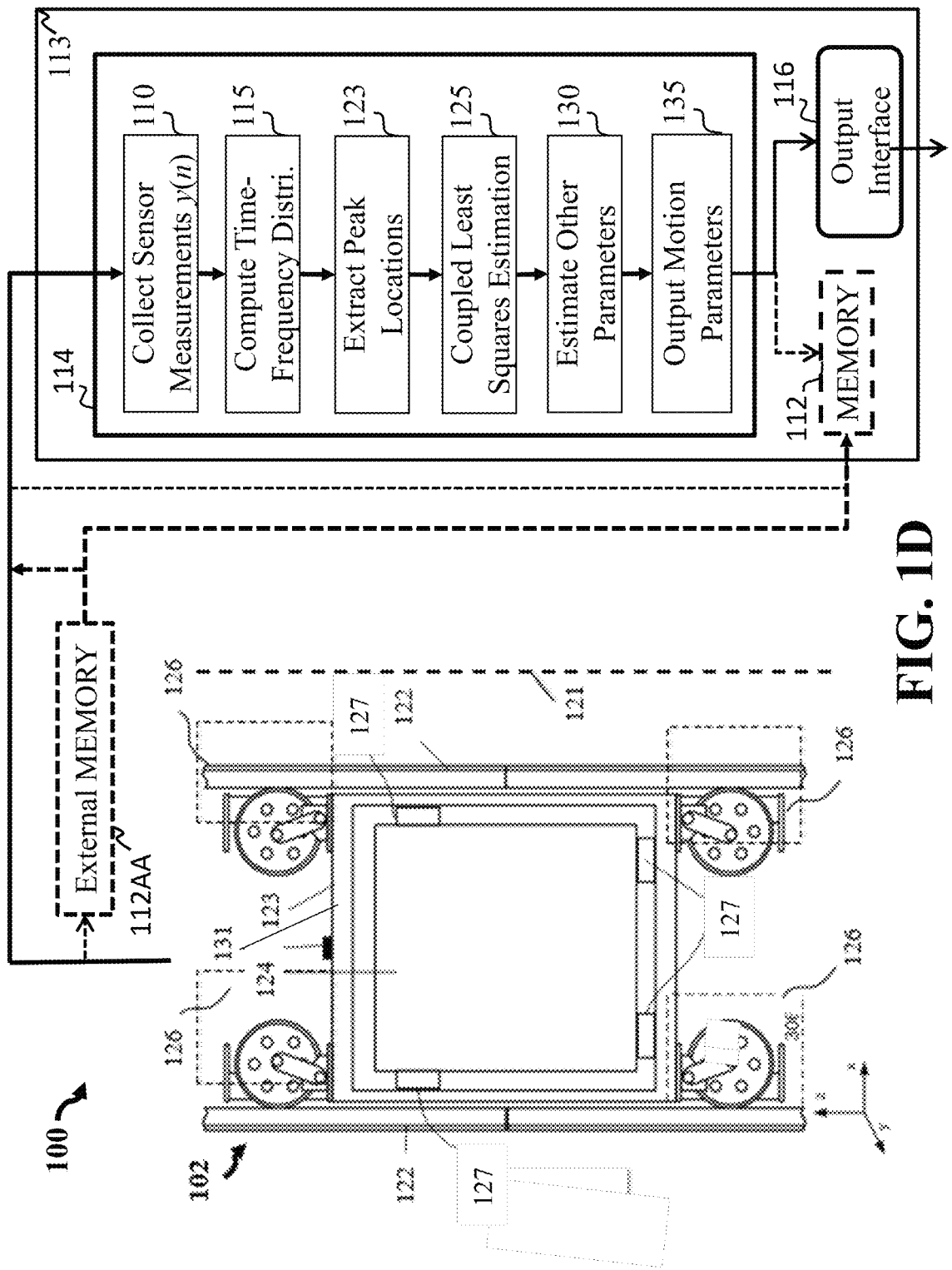
FIG. 1D is a schematic of the elevator system having a computer with a processor of FIG. 1C, along with showing the methods steps of FIG. 1B in a block diagram, according to embodiments of the present disclosure.

FIG. 1D is a schematic of the elevator system having the computer with the processor of FIG. 1C, along with showing the methods steps of FIG. 1B in a block diagram, according to embodiments of the present disclosure. FIG. 1C shows an elevator system 102 including an elevator car 124, a frame 123, four roller guide assemblies 126, and guide rails 122. The roller guides assemblies 126 act as a suspension system to minimize the vibration of the elevator car 124. The elevator car 124 and roller guide assemblies 126 are mounted on the frame 122. The elevator car 124 and frame 123 move along the guide rail 122 as constrained by the guide rollers assemblies 126.

Figure 1E:
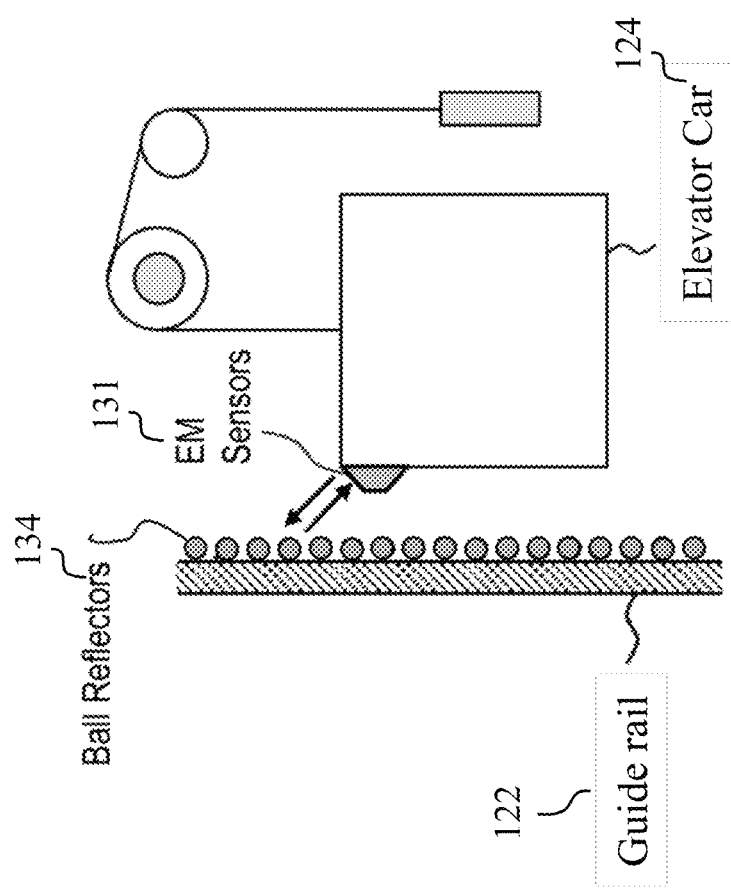
FIG. 1E illustrates some components of FIG. 1C and FIG. 1D in regard to an elevator car in an elevator system that can be used with the method, according to an embodiment of the present disclosure.
Figure 1F:
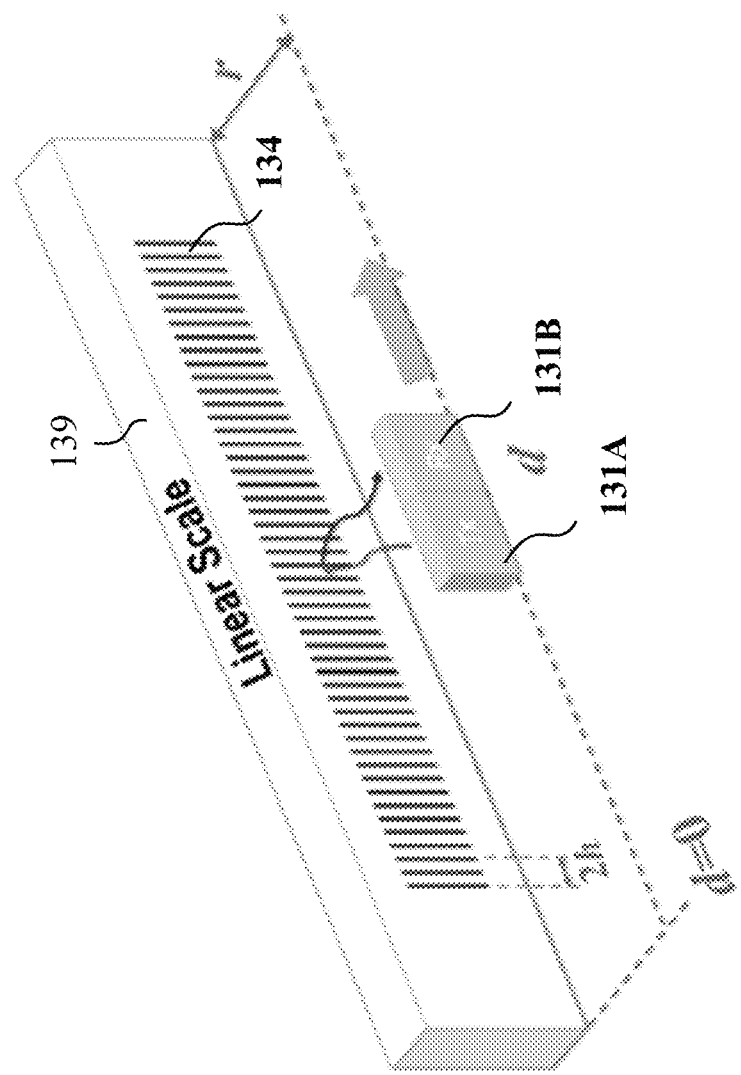
FIG. 1F illustrates the application of FIG. 1E, showing aspects of the method having a linear scale 139 having reflectors 134, along with a transmitter, that transmits a signal having a waveform, and a receiver that receives the waveform, according to an embodiment of the present disclosure.

FIG. 1E further illustrates some components of FIG. 1C and FIG. 1D in regard to the elevator car 124 in the elevator system 102 that can be used with the method, according to an embodiment of the present disclosure. In particular, regarding the guide rail or track 122 of elevator car 124, spatially placed reflectors 134 can be located on the guide rail 122, where a transmitter 131A of FIG. 1F, such as an electromagnetic transceiver, can transmit a signal having a waveform, and a receiver 131B of FIG. 1F can receive the waveform.

FIG. 1F illustrates the application of FIG. 1E, showing aspects of the method having a linear scale 139 having reflectors 134, along with a transmitter 131A, that transmits a signal having a waveform, and a receiver 131B that receives the waveform, according to an embodiment of the present disclosure. For example, FIG. 1F includes an electromagnetic transceiver 131A transmitting a signal having a waveform to the linear scale 139 that includes spatially placed reflectors 134. A receiver 131B receives the waveform reflected back toward the receiver 131B upon reflecting off of the reflectors 134 of the linear scale 139.

Referring to FIG. 2A to FIG. 2D illustrate how the present disclosure may solve the coupled sinusoidal FM-PPS model by the method presented in FIG. 1A, according to embodiments of the present disclosure.

Figure 2A:
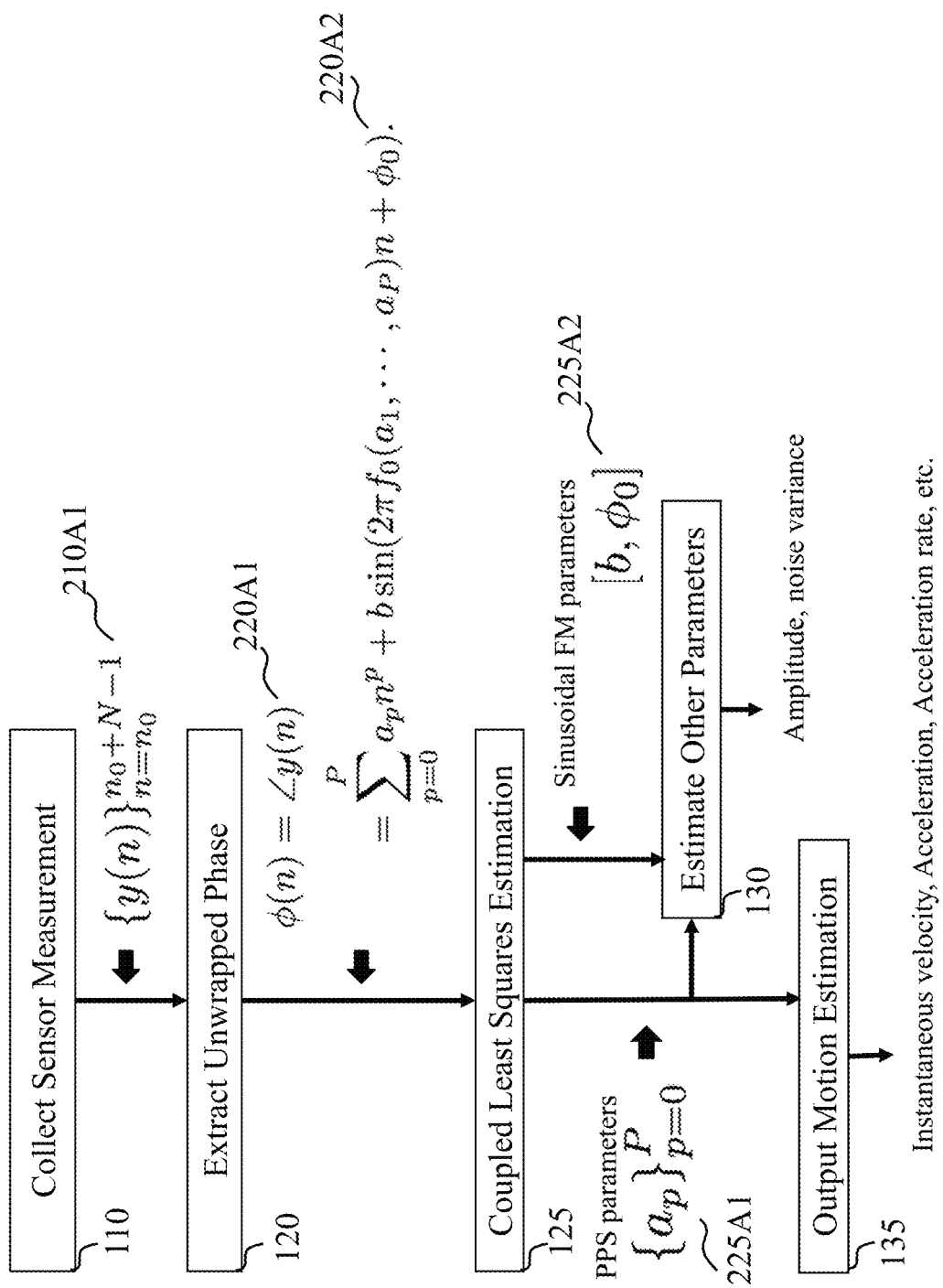
FIG. 2A to FIG. 2D illustrate how the present disclosure may solve the coupled sinusoidal FM-PPS model by the method presented in FIG. 1A, according to embodiments of the present disclosure.

FIG. 2A is a block diagram illustrating the steps of the method of FIG. 1A in further detail that include equations used for some of the steps, according to embodiments of the present disclosure.

Figure 2B:
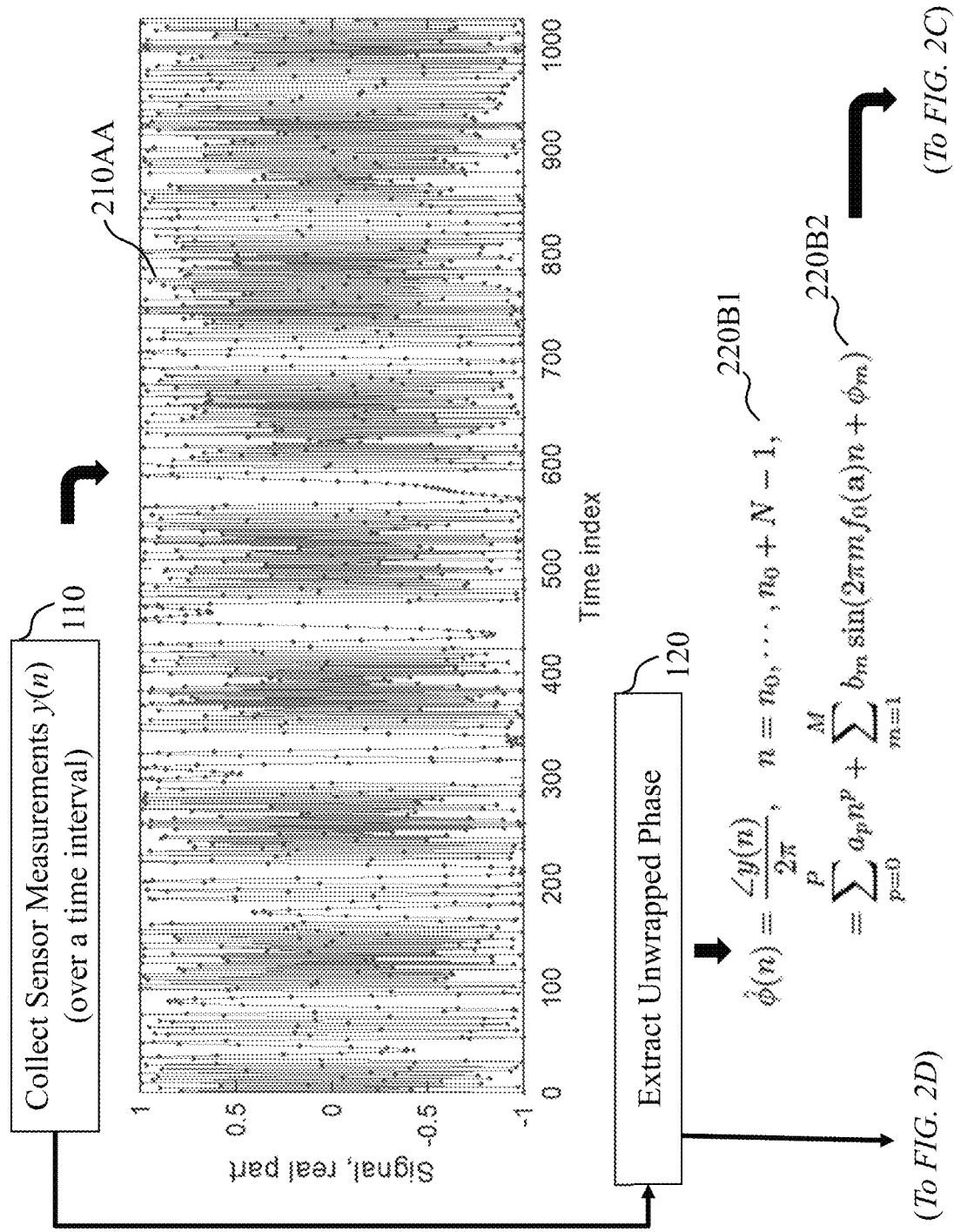

Regarding step 110 of FIG. 2A, a method of the present disclosure includes the step of collecting the analog signal from the electromagnetic transceiver 131A of FIG. 1C, and dignitally samples the analog signal into digital signals to obtain graph 210AA of FIG. 2B. Equation 210A1 represents the phase unwrapping operator of a complex-valued signal. Equation 210A2 specifies the extracted unwrapped phase according to the coupled sinusoidal FM-PPS signal model.

Figure 2C:
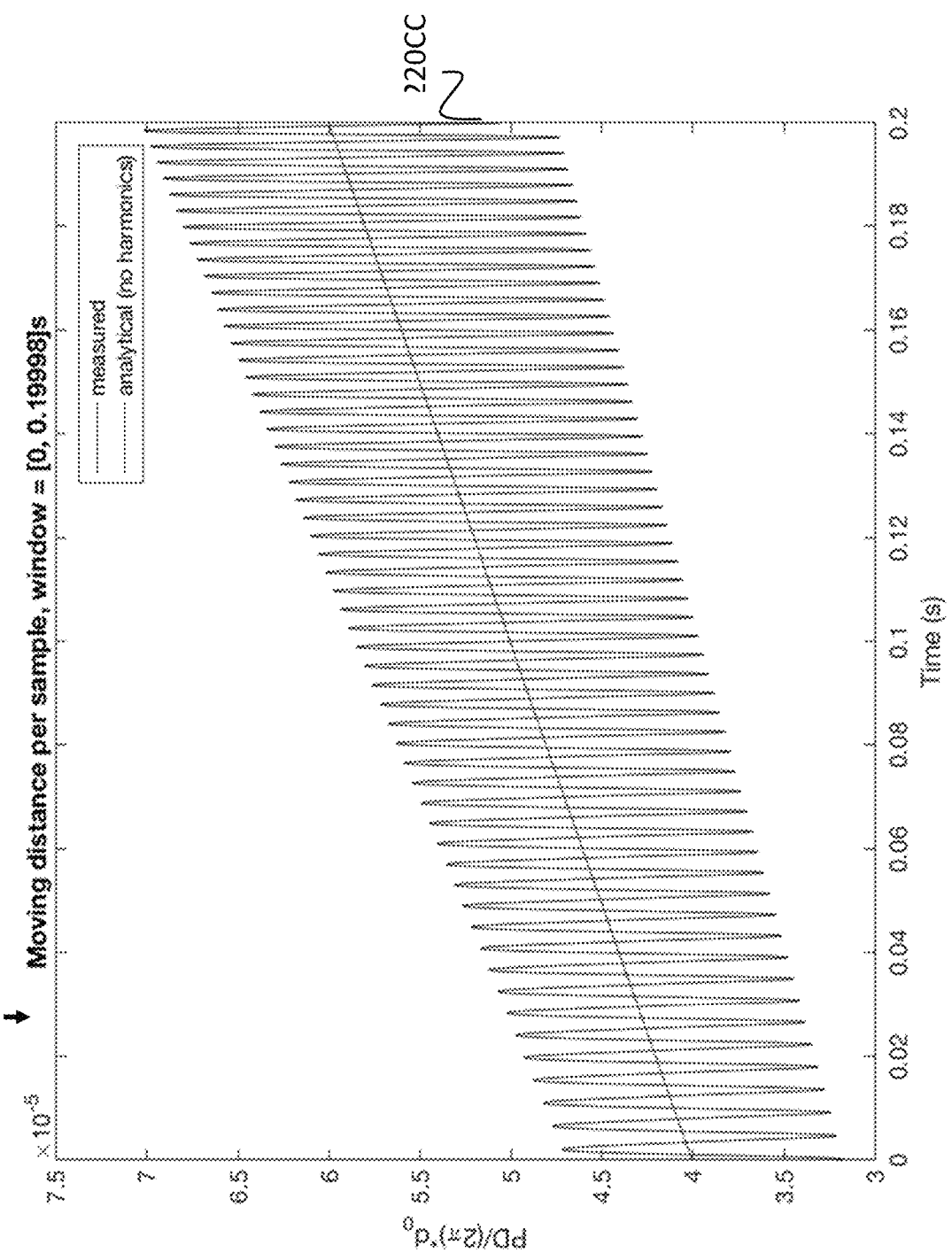

Step 120 of FIG. 2A uses the phase unwrapping technique to extract the phase information of the digital signal over a time interval using equations 220A1 and 220A2 to obtain graph 220CC of FIG. 2C.

Step 125 of FIG. 2A solves for the coupled sinusoidal FM-PPS model using the coupled least square method with the unwrapped phase as the inputs to obtain the estimates of the phase parameters including the PPS phase parameters 225A1 and sinusoidal FM parameters 225A2. Equations 225D1 and 225D2 in FIG. 2D are used to implement the coupled least square method.

Step 130 of FIG. 2A, estimates other parameters including the amplitude, the sinusoidal FM index, and initial phase parameters. These other parameters can be obtained by using equation 230D1 of FIG. 2D.

Figure 2D:
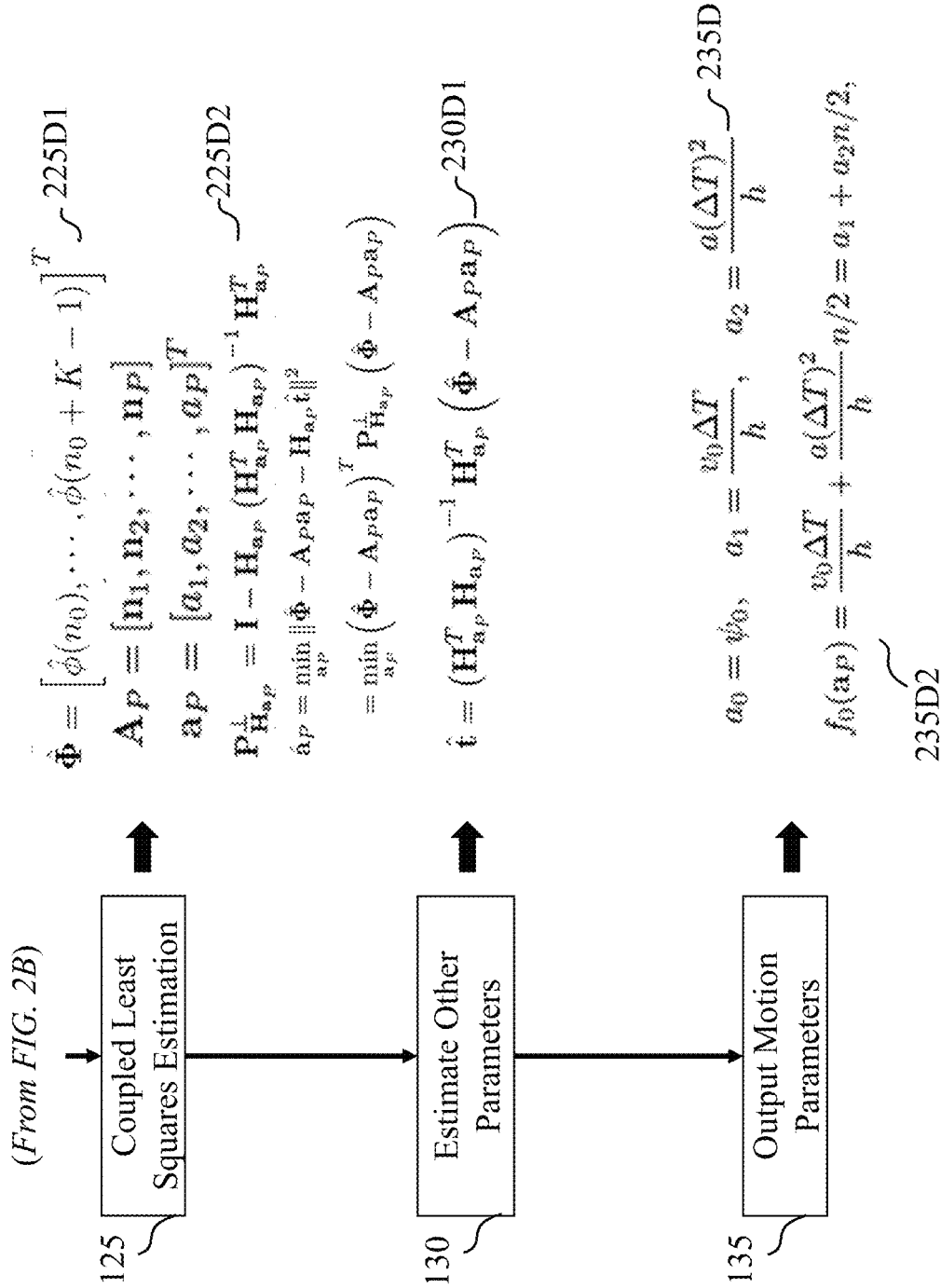

Step 135 of FIG. 2A, outputs the motion estimation by converting the above estimated phase parameters to the motion parameters, i.e., initial velocity and acceleration, using equation 235D1 in FIG. 2D. Then these motion parameters can be used via a controller to control an operation of the elevator system using the speed of the elevator car, so as to assist in an operational health management of the elevator system.

FIG. 2B is a block diagram illustrating step 110 of collecting sensor measurements over a time interval along with a graph 210AA. Further, step 220 includes extracting unwrapped phase information of the method of FIG. 2A according to the coupled sinusoidal FM-PPS signal model, according to an embodiment of the present disclosure. Graph 210AA shows the real part of the sampled signal as a function of time.

Specifically, step 120 of FIG. 2B uses the phase unwrapping technique to extract the phase information of the digital signal over a time interval using equations 220B1 and 220B2 to obtain graph 220CC of FIG. 2C.

FIG. 2C is a graph illustrating a moving distance per sample over a time interval (i.e., a time window), translated from the extracted unwrapped phase information of FIG. 2B. Graph 220C clearly shows the coupling of two components: 1) the straight line which is a polynomial function over time (i.e., the x-axis) and 2) an oscillating component that is a sinusoidal FM component. The combination of both components gives the coupled sinusoidal FM-PPS component whose phase is shown in the blue curve.

FIG. 2D is a block diagram illustrating some steps of the method of FIG. 2A, including the step of coupling least squares estimation, the step of estimating other parameters and output motion parameters, along with equations for some of the steps, according to embodiments of the present disclosure.

Step 125 of FIG. 2D solves for the coupled sinusoidal FM-PPS model using the coupled least square method with the unwrapped phase as the inputs, using equations 225D1, 225D2 to obtain the estimates of the phase parameters.

Step 130 of FIG. 2D, estimates other parameters including the amplitude, the sinusoidal FM index, and initial phase parameters. These other parameters can be obtained by using equation 230D1.

Step 135 of FIG. 2D, outputs motion parameters by converting the above estimated phase parameters, i.e., initial velocity and acceleration, using equation 235D1.

Figure 3A:
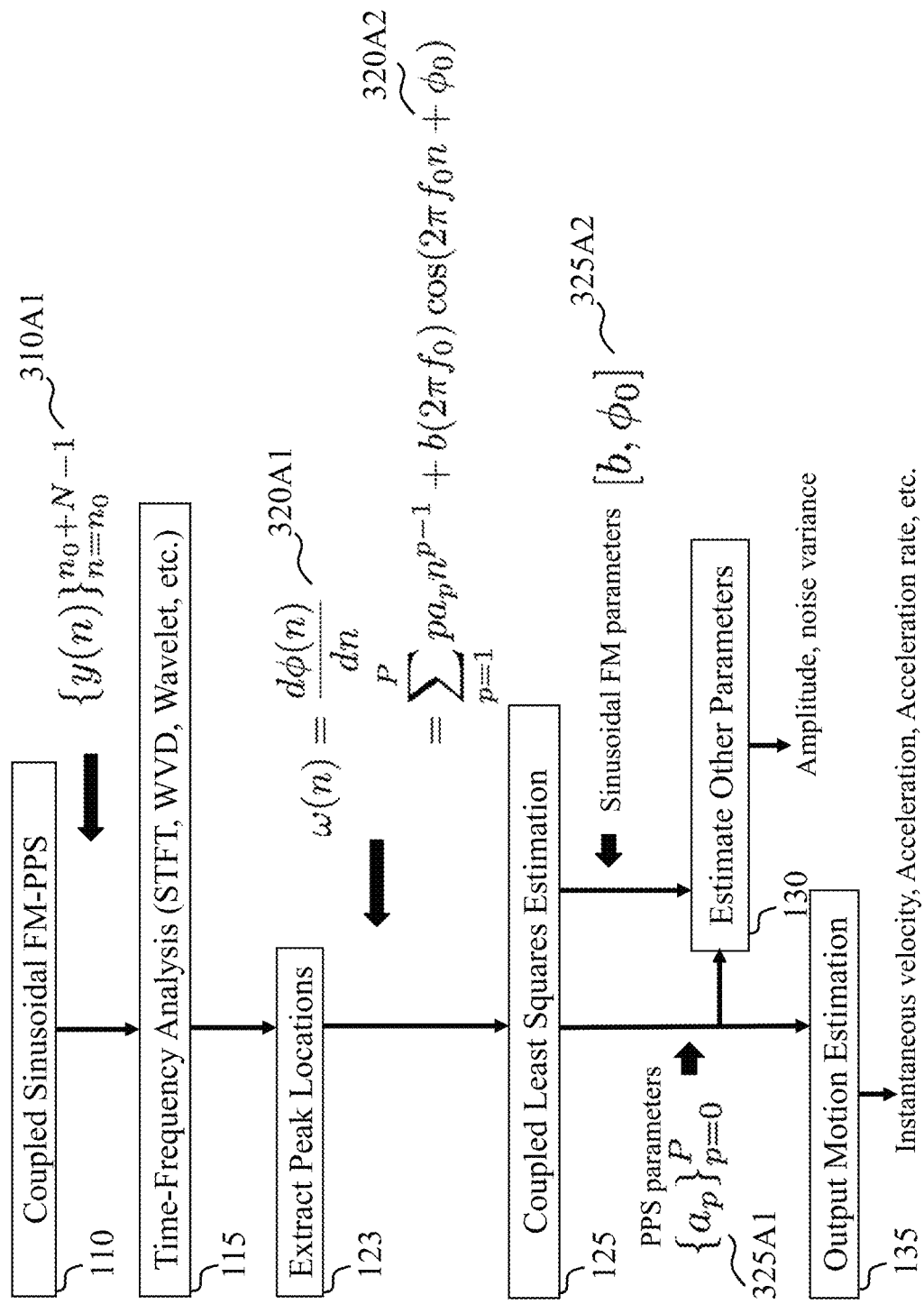
FIG. 3A to FIG. 3D illustrate the steps of the method of FIG. 1B in further detail including equations used for some of the steps, according to embodiments of the present disclosure.

FIG. 3A is a block diagram illustrating some steps of the method of FIG. 1B in further detail including equations used for some of the steps, according to embodiments of the present disclosure.

Figure 3B:
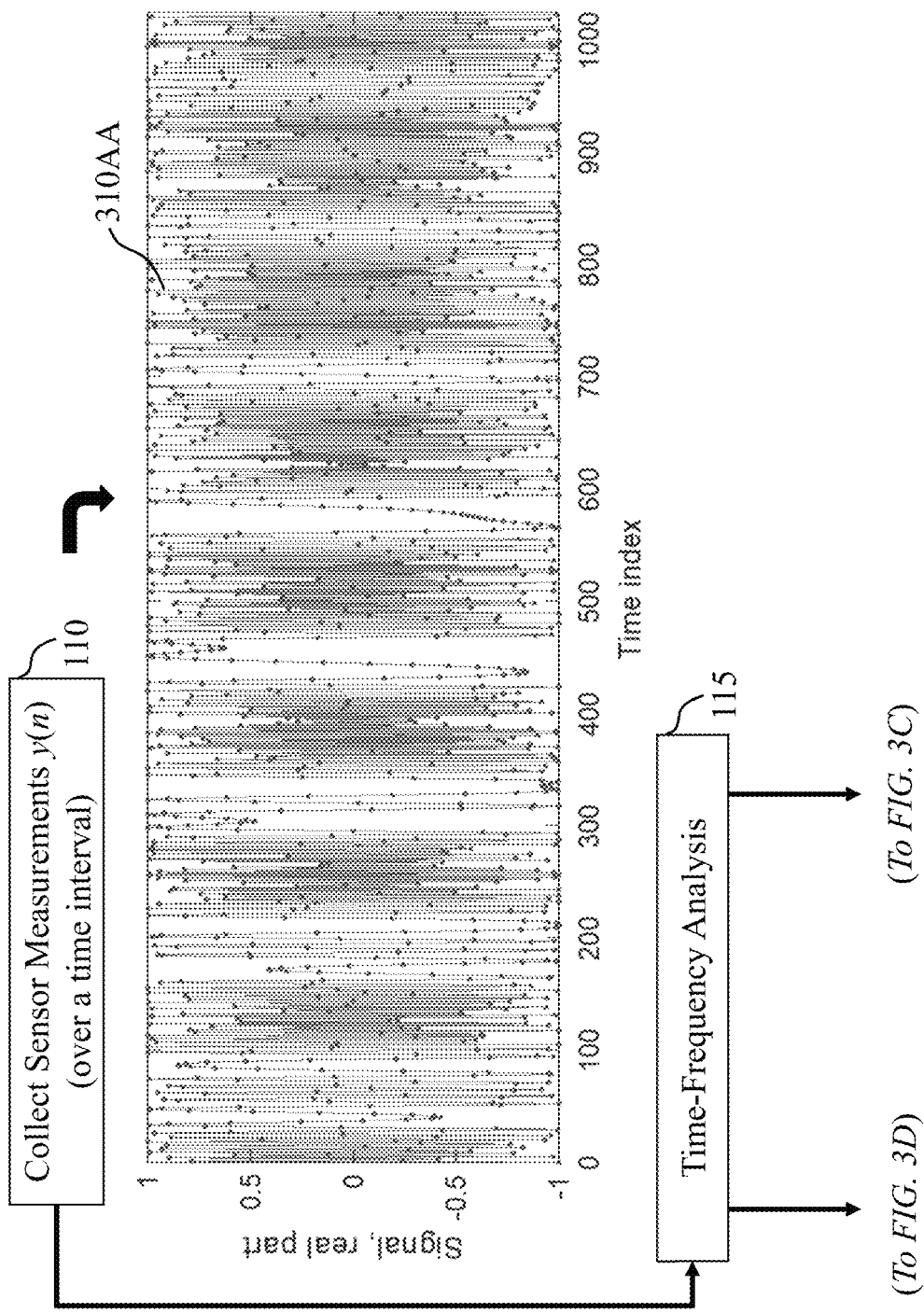

Step 110 of FIG. 3A collects the analog signal from the electromagnetic transceiver 131A of FIG. 1C, and dignitally samples the analog signal into digital signals to obtain graph 310AA of FIG. 3B. The digital signal is represented by Equation 310A1.

Figure 3C:
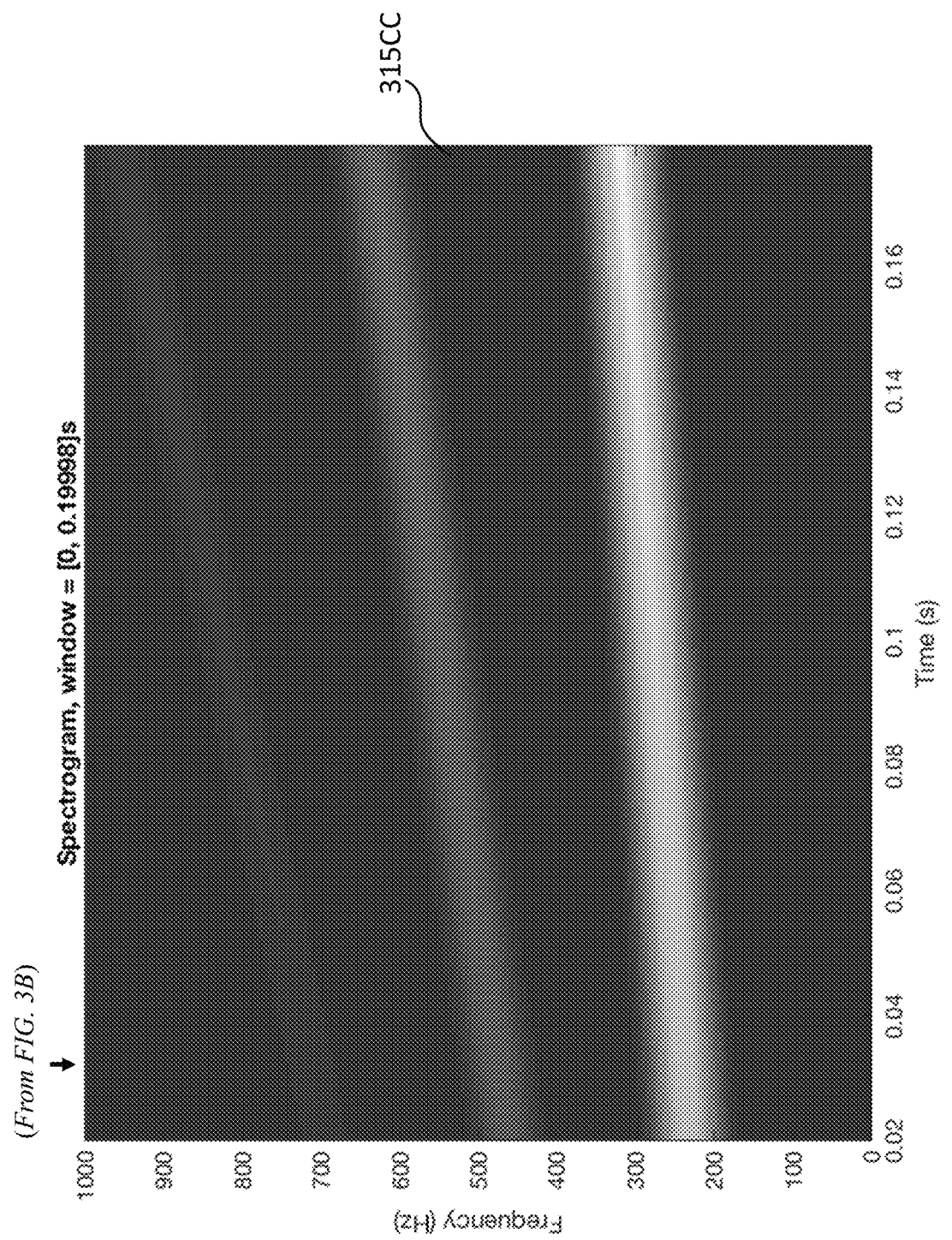

Step 115 of FIG. 3A computes the time-frequency distributions of the digital signal. For example, there are many possibilities to compute the time-frequency distribution, such as, the short-time Fourier transform (STFT), the Wigner-Ville distribution (WVD), and the Wavelet. For instance, graph 315C of FIG. 3C shows the squared magnitude of the STFT of the digital signal over a time interval.

Step 123 of FIG. 3A extracts, with the equation 320A1, the peak locations of the squared magnitude of the time-frequency distribution of the digital signal over a time interval. The peak locations, in a noiseless case, follows the equation of 320A2.

Figure 3D:
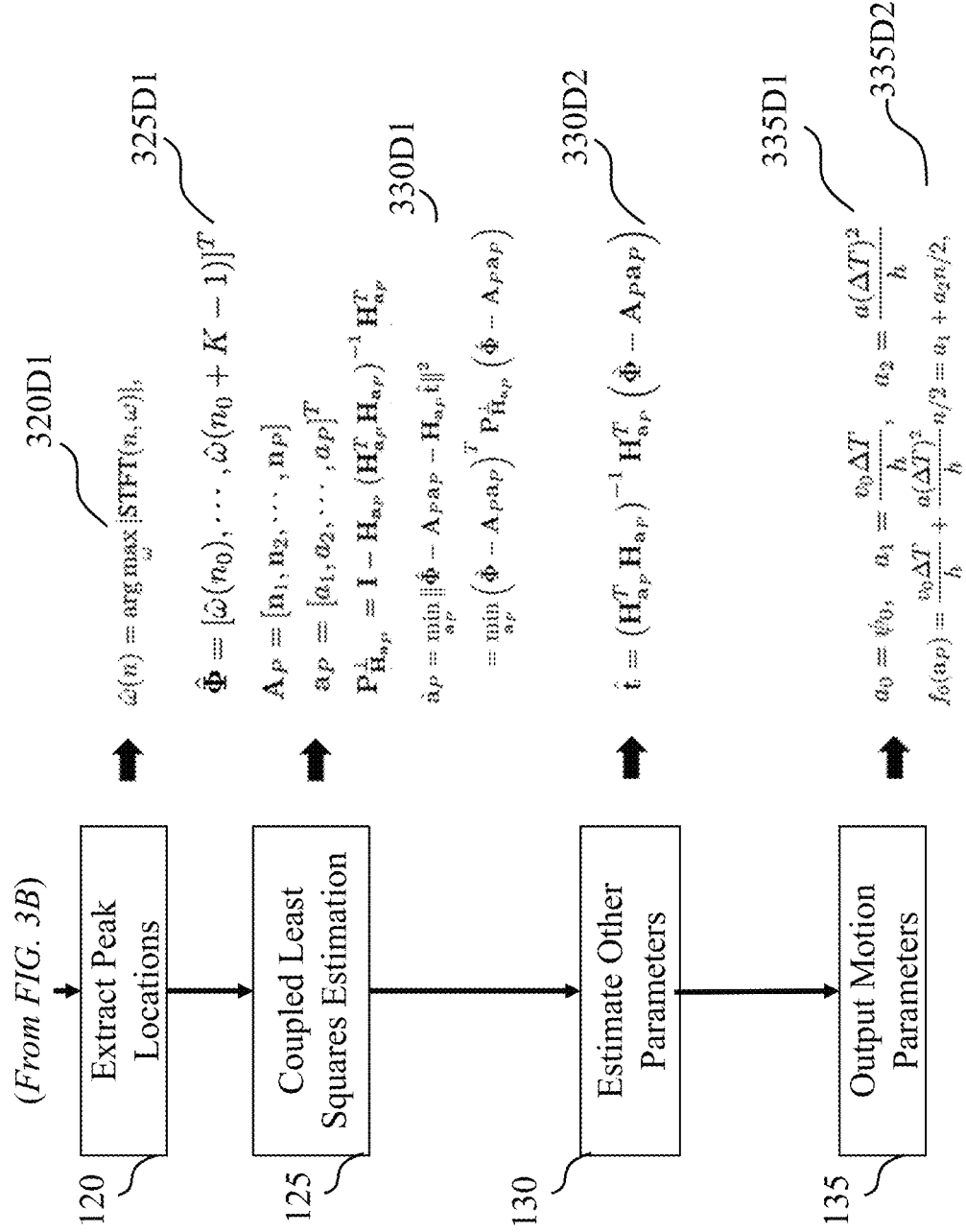

Step 125 of FIG. 3A solves for the coupled sinusoidal FM-PPS model using the coupled least square method with the peak locations as the inputs, using equations 325D1 and 330D1 of FIG. 3D to obtain the estimates of the phase parameters of equation 325A1 and the sinusoidal FM parameters of equation 325A2.

Step 130 of FIG. 3A, estimates other parameters including the amplitude, the sinusoidal FM index, and initial phase parameters. These other parameters can be obtained by using equation 330D2 of FIG. 3D Step 135 of FIG. 3A, outputs motion parameters by converting the above estimated phase parameters, i.e., initial velocity and acceleration, using equations 335D1 and 335D2.

FIG. 3B is a block diagram illustrating some steps of the method of FIG. 2B, including step 110 of collecting sensor measurements over a time interval along with a graph 310AA, and step 115 computing the time-frequency distributions, according to embodiments of the present disclosure. Graph 310AA shows the real part of the sampled signal as a function of time. Step 115 can be implemented by many choices such as the short-time Fourier transform (STFT), the Wigner-Ville distribution and the wavelets. The choice can be determined depending on the computational complexity (fast computation time) or the performance against to the noise is prioritized.

FIG. 3C is a graph illustrating the spectrogram, i.e., the squared magnitude of the STFT, of the signal shown in FIG. 3B over a time interval, i.e., a time window). Graph 315CC shows the spectrogram with x-axis denoting the time index and y-axis denoting the frequency index.

FIG. 3D is a block diagram illustrating some steps of the method of FIG. 3A, including the step of extracting peak locations, the step of coupling least squares estimation, the step of estimating other parameters and the step of outputting motion parameters, along with equations for some of the steps, according to embodiments of the present disclosure.

Step 120 of FIG. 3D locates the frequency index corresponding to a peak in the time-frequency distribution for a given time index. Equation 320D1 represents the peak search operator which finds all frequency indices of peaks at different time indices, and outputs a series of frequency indices.

Step 125 of FIG. 3D solves for the coupled sinusoidal FM-PPS model using the coupled least square method with the peak locations as the inputs, using equations 325D1 and 330D1 to obtain the estimates of the PPS phase parameters and the sinusoidal FM parameters.

Step 130 of FIG. 2D estimates other parameters including the amplitude, the sinusoidal FM index, and initial phase parameters using equation 330D2.

Step 135 of FIG. 2D outputs motion parameters by converting the above estimated phase parameters, i.e., initial velocity and acceleration, using equations 335D1 and 335D2.

Figure 4:
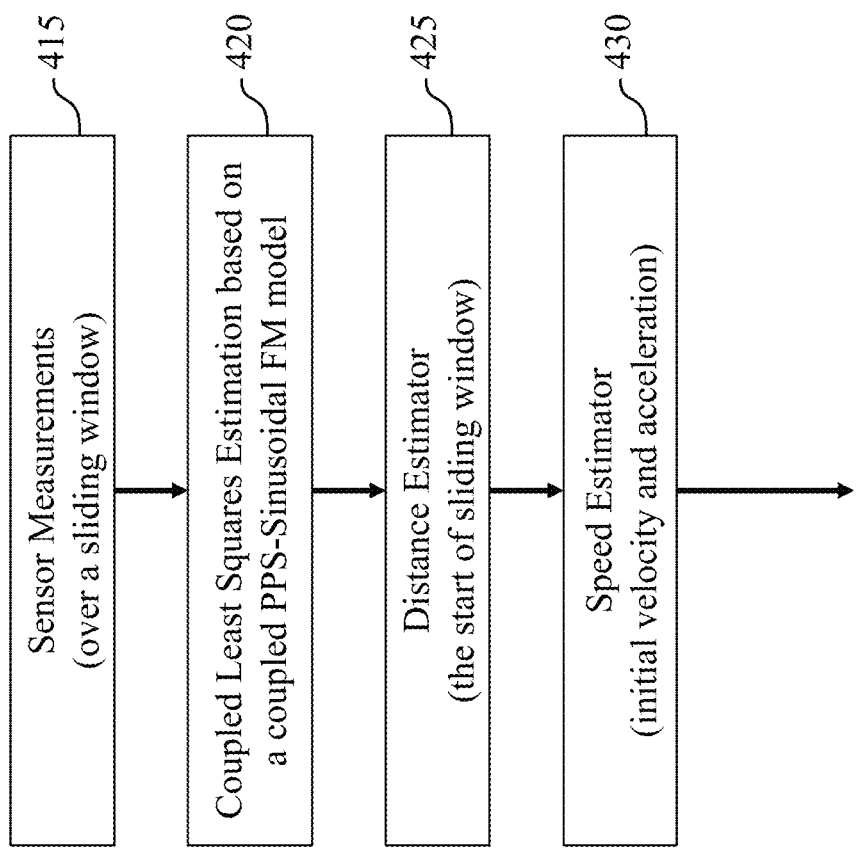
FIG. 4 is a block diagram illustrating the steps to output the distance and speed estimates from the phase parameter estimates by the two enclosed methods, according to embodiments of the present disclosure.

FIG. 4 is a block diagram illustrating the steps to output the distance and speed estimates from the phase parameter estimates by the two enclosed methods, according to embodiments of the present disclosure.

Step 415 includes sensor measurements digitally sampled by the transceiver. The sensor measurements include the measurement value as a function of time.

Step 420 includes a coupled Least Squares Estimation based on a coupled PPS-Sinusoidal FM model which can be implemented by either the PULS method summarized from FIG. 2A to FIG. 2D or the TFLS method summarized from FIG. 3A to FIG. 3D.

Step 425 includes a distance estimator which converts the phase parameters into a distance.

Step 430 includes a speed estimator to output the current speed of the elevator cage from the estimated distance of Step 425.

Figure 5:
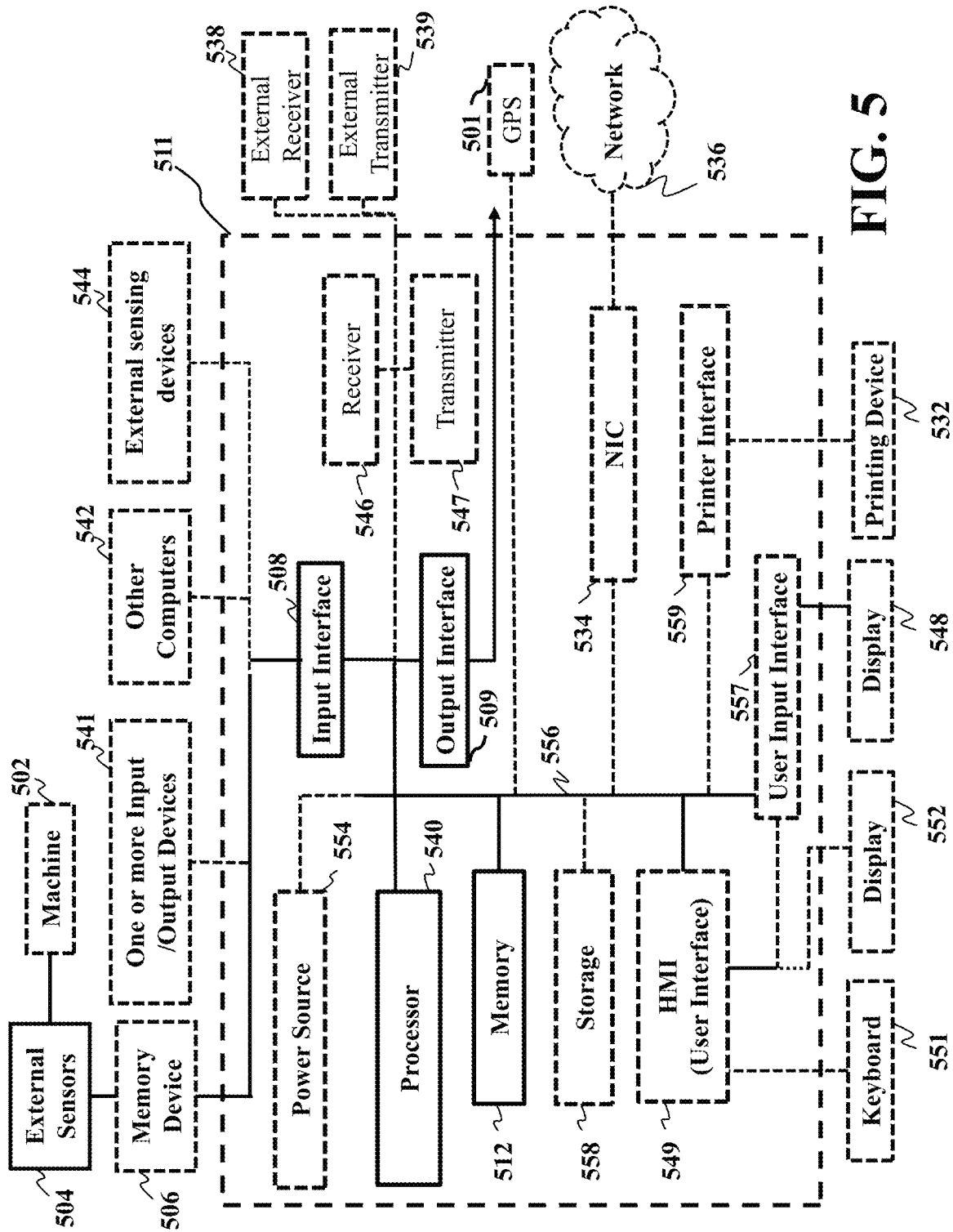
FIG. 5 is a block diagram illustrating the methods of FIG. 1A and FIG. 1B, that can be implemented using an alternate computer or processor, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 564 in communication with the processor 540 and the computer readable memory 512, acquires and stores the signal data examples in the computer readable memory 512 upon receiving an input from a surface, keyboard surface 564, of the user interface 564 by a user.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein time series data or other data, among other things, can be rendered on a third party display device, third party imaging device, and/or third party printing device outside of the computer 511.

Still referring to FIG. 5, the signal data or other data, among other things, can be transmitted over a communication channel of the network 536, and/or stored within the storage system 558 for storage and/or further processing. Contemplated is that the signal data could be initially stored in an external memory and later acquired by the processor to be processed or store the signal data in the processor's memory to be processed at some later time. The processor memory includes stored executable programs executable by the processor or a computer for performing the elevator systems/methods, elevator operation data, maintenance data and historical elevator data of the same type as the elevator and other data relating to the operation health management of the elevator or similar types of elevators as the elevator.

Further, the signal data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. For example, the external sensing devices 544 may include sensors gathering data before-during-after of the collected signal data of the elevator/conveying machine. For instance, environmental conditions approximate the machine or not approximate the elevator/conveying machine, i.e. temperature at or near elevator/conveying machine, temperature in building of location of elevator/conveying machine, temperature of outdoors exterior to the building of the elevator/conveying machine, video of elevator/conveying machine itself, video of areas approximate elevator/conveying machine, video of areas not approximate the elevator/conveying machine, other data related to aspects of the elevator/conveying machine. The computer 511 may be connected to other external computers 542. An output interface 509 may be used to output the processed data from the processor 540. It is noted that a user interface 549 in communication with the processor 540 and the non-transitory computer readable storage medium 512, acquires and stores the region data in the non-transitory computer readable storage medium 512 upon receiving an input from a surface 552 of the user interface 549 by a user.

Linear Optical, Electric and Magnetic Encoders

An encoder is an electromechanical device that can monitor motion or position. Among others, optical, electric and magnetic encoders are commonly used for high accuracy motion and position measurements. The encoder can normally consist of a stationary scale and a moving readhead, or vice versa, see FIG. 1F. The source transceivers can be mounted on the moving readhead with a distance of r to the scale platform. Uniformly spaced reflectors, e.g., rectangular bars, can be installed on the scale platform to constitute a spatial period with an inter-reflector spacing of h. Then the position and speed of the moving readhead can be inferred from reflected signals in different approaches. One of those approaches is a phase detection approach which detects the phase from the reflected signal. Generally, the reflected signals from the spatially periodic linear scale can be written as $$x(d) = Ae^{j2\pi\left[\frac{d}{h} + \sum_{m=1}^{M} b_m \sin\left(\frac{2\pi md}{h} + \phi_m\right) + \psi_0\right]}, \quad (1)$$

where A is the unknown amplitude, d is the axial position index of the moving readhead, $b_m > 0$ and $\phi_m$ are the modulation index and, respectively, the initial phase of the m-th sinusoidal FM component, M is the number of sinusoidal FM components in the phase, and $\psi_0$ is the initial phase. The first phase term is due to the phase change proportional to the inter-reflector spacing of h. Therefore, the moving distance and speed of the moving readhead can be inferred from the change in the first phase term. Meanwhile, the second term is, induced by the spatially periodic reflectors, the motion-related sinusoidal FM component. From (1), we have x(d)=x(d+lh), where l is an integer. That is the moving readhead sees exactly the same reflected waveforms at two axial positions which are at a distance of h apart from each other.

With a sampling interval of $\Delta T$ and assuming that the readhead moves at an initial velocity of $v_0$ and an acceleration of a, we can transform the position index to the discrete-time index via $d = v_0 t + at^2/2 |_{t=n\Delta T} = v_0 n\Delta T + a(n\Delta T)^2/2$, $n = n_0, \ldots, n_0 + N - 1$ with $n_0$ and N denoting the initial sampling index and the number of total samples, respectively. As a result, the discrete-time reflected signal is given as $$x(n) = \qquad (2)$$
$$Ae^{j2\pi\left[\frac{v_0 n\Delta T + a(n\Delta T)^2/2}{h} + \psi_0\right]} \times e^{j\sum_{m=1}^{M} 2\pi\left[b_m \sin\left(2\pi m \frac{v_0 n\Delta T + a(n\Delta T)^2/2}{h} + \phi_m\right)\right]}.$$

Note that the sinusoidal FM frequency is now a function of the motion-related phase parameter (e.g., $v_0$ and a) of the moving readhead.

The Coupled Mixture of PPS and Sinusoidal FM Signal

For more dynamic motions of the readhead, higher-order phase terms may appear in the reflected signal. For instance, if the acceleration is time-varying, a third-order phase term (on $t^3$) may be required to model the reflected signal, i.e., $d=v_0 t+at^2/2+gt^3/6$ where g denotes the acceleration rate. To generalize the coupled signal model, we propose here a coupled mixture of the PPS and sinusoidal FM signals:

$$x(n) = Ae^{j2\pi\left[\sum_{p=0}^{P}\frac{a_p n^p}{p!} + \sum_{m=1}^{M} b_m \sin(2\pi m f_0(a_1,\ldots,a_P)n + \phi_m)\right]}, \quad (3)$$

where the fundamental sinusoidal FM frequency $f_0$ is now coupled with the PPS phase parameters, $a_1, \ldots, a_P$. Depending on applications, the coupling function $f_0(a_1, \ldots, a_P)$ can be either nonlinear or linear with respect to $\{a_p\}_{p=1}^P$. In the case of linear encoders, it is a linear function as $f_0(a_1, \ldots, a_P) = c_0 \sum_{p=1}^{P} a_p n^{p-1}/p!$ with $c_0$ denoting a known scaling factor.

To see how the linear encoder example fits into the coupled mixture, we can establish the following variable changes between (2) and (3)

$$b_m = b_m, a_0 = \psi_0, a_1 = \frac{v_0 \Delta T}{h}, a_2 = \frac{a(\Delta T)^2}{h}, \quad (4)$$

$$f_0(a_1, a_2) = \frac{v_0 \Delta T}{h} + \frac{a(\Delta T)^2}{h} n/2 = c_0(a_1 + a_2 n/2),$$

with $c_0=1$ and a PPS order of P=2.

The coupled mixture model of (3) is distinct from the independent mixture model [12-15, 20-22]

$$x(n) = Ae^{j2\pi\left[\sum_{p=0}^{P}\frac{a_p n^p}{p!} + \sum_{m=1}^{M} b_m \sin(2\pi m f_0 n + \phi_m)\right]}, \quad (5)$$

where the FM frequency $f_0$ is independent of the PPS parameters $\{a_p\}_{p=1}^P$. Second, it generalizes the pure PPS model $$x(n) = Ae^{j2\pi \sum_{p=0}^{P} \frac{a_p}{p!} n^p}$$

as a special case when $b_m=0$.

The present disclosure can include a PULS method and a TFLS method to estimate the phase parameters, e.g., $\{a_p\}$, of the coupled mixture of PPS and sinusoidal FM signal in (5). With the estimated phase parameters, one can recover the motion-related parameters, e.g., $v_0$ and a, via (4).

At least one problem of interest is to estimate the phase parameters $\{a_p\}_{p=1}^P$ from a finite number of noisy samples $$y(n)=x(n)+v(n) \quad (6)$$

where $x(n)$ is given in (5) and $v(n)$ is assumed to be Gaussian distributed with zero mean and variance $\sigma^2$.

PULS: The Phase Unwrapping and Least Square Method

As shown in FIG. 1A, the PULS estimator first obtains the phase information with a standard phase unwrapping technique, $$\hat{\phi}(n) = \frac{\angle y(n)}{2\pi} = \sum_{p=0}^{P} a_p n^p + \sum_{m=1}^{M} b_m \sin(2\pi m f_0(a_1, \ldots, a_P)n + \phi_m) + w(n) \quad (8)$$

where $w(n)$ is the noise contribution after the phase unwrapping. Then we can estimate the phase parameters by the nonlinear least square method. Specifically, we group N phase estimates $\hat{\Phi}=[\hat{\phi}(n_0), \ldots, \hat{\phi}(n_0+N-1)]^T$ and define the following variables $$A_P=[n_1, n_2, \ldots, n_P], a_P=[a_1, a_2, \ldots, a_P]^T \quad (9)$$

with $n_p=[n_0^p, \ldots, (n_0+N-1)^p]^T$, $$S_M(a_P)=[s_1, s_2, \ldots, s_M], C_M(a_P)=[c_1, c_2, \ldots, c_M] \quad (10)$$

with $s_m=[\sin(2\pi m f_0 n_0), \ldots, \sin(2\pi m f_0(n_0+N-1))]^T$ and $c_m=[\cos(2\pi m f_0 n_0), \ldots, \cos(2\pi m f_0(n_0+N-1))]^T$, both are a function of via $f_0$, and $$t=[a_0, b_1 \cos(\phi_1), \ldots, b_M \cos(\phi_M), b_1 \sin(\phi_1), \ldots, b_M \sin(\phi_M)]^T \quad (11)$$

Then (8) is equivalent to $$\hat{\Phi} = A_P a_P + [a_0, S_M(a_P), C_M(a_P)]t \quad (12)$$

$$= A_P a_P + H_{a_P} t$$

where $H_{a_P}=[a_0, S_M(a_P), C_M(a_P)]$ with $S_M(a_P)$ and $C_M(a_P)$ depending on $a_P$.

If $a_P$ is given, the other phase parameters $a_0$ and $\{b_m, \phi_m\}_{m=1}^M$, or, equivalently, can be estimated via a simple linear least square method.

$$\hat{t}=(H_{a_P}^T H_{a_P})^{-1} H_{a_P}^T(\hat{\Phi}-A_P a_P) \quad (13)$$

Then the parameter $a_P$ can be estimated by solving the nonlinear least square function as $$\hat{a}_P = \min_{a_P} \left\|\hat{\Phi} - A_P a_P - H_{a_P} \hat{t}\right\|^2 = \min_{a_P}(\hat{\Phi}-A_P a_P)^T P_{H_{a_P}}^\perp (\hat{\Phi}-A_P a_P) \quad (14)$$

where $P_{H_{a_P}}^\perp = I - H_{a_P}(H_{a_P}^T H_{a_P})^{-1} H_{a_P}^T$ is the projection matrix. With $\hat{a}_P$ and $\hat{t}$, the phase parameters are all estimated.

TFLS: The Time-Frequency Analysis and Least Square Method

As shown in FIG. 1B, the TFLS method extracts the instantaneous frequency (IF) of the complex-valued input signal and estimates the PPS phase parameters by fitting the extracted IF with the nonlinear least square method.

Here, we use the short-time Fourier transform (STFT) as an example for the initial IF estimation. The STFT is defined as $$STFT_h(n, \omega) = \sum_k w_h(k) x(n+k) e^{-jk\omega}, \quad (15)$$

where $w_h(k)$ is a window function: $w_h(k) \neq 0$ for $|k| \leq h/2$ and $w_h(k)=0$ elsewhere.

The window function is usually a decreasing function from the origin k=0 such that $w_h(|k_1|) \geq w_h(|k_2|)$ if $|k_1| \leq |k_2|$. Then the IF can be estimated as $$\hat{\omega}_h(n) = \arg\max_\omega |STFT_h(n, \omega)|. \quad (16)$$

The STFT-based IF estimator is biased. The bias increases as the window size h increases. At the same time, the estimation variance decreases as more samples are used with a larger window. Specifically, the estimated IF can be expressed as $$\hat{\omega}_h(n) = \sum_{m=1}^{M} 2\pi m(f_0 + f_0' n) b_m \cos(2\pi m f_0 n + \phi_m) + \sum_{p=1}^{P} p a_p n^{p-1} + w(n) \quad (17)$$

$$\text{where } f_0' = \frac{\partial f_0(a_1, \ldots, a_P, n)}{n}$$

and w(n) is the noise contribution to the IF estimator.

Here, the dependence of $f_0$ on $a_1, \ldots, a_P$ and n is omitted for brevity. It is seen that the above IF estimate contains information on the phase parameters $\{a_p\}_{p=1}^{P}$. Moreover, we also note that the IF estimator is a function of the window size h.

Next, we use the nonlinear least square method to estimate the phase parameters. Specifically, we group N IF estimates $\hat{\Omega}_h = [\hat{\omega}_h(n_0), \ldots, \hat{\omega}(n_0+N-1)]^T$ and the P phase parameters of interest $a_P = [a_1, a_2, \ldots, a_P]^T$. Define the following variables $$A_P = [n_1, n_2, \ldots, n_P], \quad (18)$$

where $$n_P = \left[p n_0^{p-1}, \ldots, p(n_0 + N - 1)^{p-1}\right]^T, C_M(a_P) = [c_1, c_2, \ldots, c_M], \quad (19)$$

with $$c_m = \begin{bmatrix} 2\pi m(f_0 + f_0' n_0) \cos(2\pi m f_0 n_0) \\ 2\pi m(f_0 + f_0'(n_0 + 1)) \cos(2\pi m f_0(n_0 + 1)) \\ \vdots \\ 2\pi m(f_0 + f_0'(n_0 + N - 1)) \cos(2\pi m f_0(n_0 + N - 1)) \end{bmatrix}, \quad (20)$$

$$S_M(a_P) = [s_1, s_2, \ldots, s_M], \quad (21)$$

with $$s_m = \begin{bmatrix} 2\pi m(f_0 + f_0' n_0) \sin(2\pi m f_0 n_0) \\ 2\pi m(f_0 + f_0'(n_0 + 1)) \sin(2\pi m f_0(n_0 + 1)) \\ \vdots \\ 2\pi m(f_0 + f_0'(n_0 + N - 1)) \sin(2\pi m f_0(n_0 + N - 1)) \end{bmatrix}, \quad (22)$$

and $$t = [b_1 \cos(\phi_1), \ldots, b_M \cos(\phi_M), -b_1 \sin(\phi_1), \ldots, -b_M \sin(\phi_M)]^T. \quad (23)$$

Then (17) is equivalent to $$\hat{\Omega}_h = A_P a_P + [C_M(a_P), S_M(a_P)] t$$
$$= A_P a_P + H_{a_P} t \quad (24)$$

where $H_{a_P} = [C_M(a_P), S_M(a_P)]$ with $S_M(a_P)$ and $C_M(a_P)$ depending on $a_P$. If $a_P$ is given, the other phase parameters $\{b_m, \phi_m\}_{m=1}^{M}$, or, equivalently, t, can be estimated via a simple linear least square method.

$$\hat{t} = (H_{a_P}^T H_{a_P})^{-1} H_{a_P}^T (\hat{\Phi} - A_P a_P) \quad (25)$$

Then the parameter $a_P$ can be estimated by solving the nonlinear least square function as $$\hat{a}_P = \min_{a_P} \|\hat{\Phi} - A_P a_P - H_{a_P} \hat{t}\|^2 = \min_{a_P} (\hat{\Phi} - A_P a_P)^T P_{H_{a_P}}^{\perp} (\hat{\Phi} - A_P a_P) \quad (26)$$

$$\text{where } P_{H_{a_P}}^{\perp} = I - H_{a_P}(H_{a_P}^T H_{a_P})^{-1} H_{a_P}^T$$

is the projection matrix.

Due to the estimation bias of the IF, the obtained estimate of the phase parameters $_P$ needs to be refined. Particularly, we use the following refinement procedure to minimize the estimation bias.

First, the original signal is dechirped with the estimated phase parameters and low-pass filtered decimated signal $$\hat{y}_h(l) = \frac{1}{L} \sum_{k=-lL+n_0}^{-lL+n_0+N-1} y(k) e^{-j2\pi \left[\sum_{p=1}^{P} \frac{\hat{a}_p k^p}{p!} + \sum_{m=1}^{M} \hat{b}_m \sin(2\pi m f_0(\hat{a}_1, \ldots, \hat{a}_P) k + \hat{\phi}_m)\right]} \quad (27)$$

where L is the filter length. It is seen that the dechirp operation demodulates the high-frequency component and moves the signal spectrum to the DC. The low-pass filter is applied to increase the SNR. Then, we compute the phase of the above residual signal $$\hat{\phi}(n) = \frac{L \hat{y}_h(l)}{2\pi} \quad (28)$$

The signal $\hat{\phi}(n)$ is a PPS with phase parameters $_1 = [a_0, \delta a_{1,h}, \ldots, \delta a_{P,h}]$, where $\delta a_{p,h} = a_P - \hat{a}_{p,h}$. Then the parameters $_1$ can be estimated by a linear polynomial regression with the estimate $_1$. With the refinement, we can update the initial estimate as $$\hat{a}_p^r = \hat{a}_p + \frac{\delta a_{p,h}}{L^p} \quad (29)$$

where the initial estimate $\hat{a}_p$ is from (14).

Finally, we need to optimize the window size h. Given a selection of l window sizes=$[h_1, h_2, \ldots, h_l]$, we repeat the following steps: For each h∈

Apply the STFT of (15) to the original signal y(n);

Estimate the IF using (16);

Estimate the phase parameters, $b_m$, $\phi_m$ and $\{a_p\}_{p=1}^{P}$, using (25) and (26) for initial phase estimates;

Refine the initial phase estimates using (27)-(29);

Evaluate the quasi-ML function $$J(h) = \left| \sum_n y(n) e^{-j2\pi \left[ \sum_{p=1}^{P} \frac{\hat{a}_p^r n^p}{p!} + \sum_{m=1}^{M} \hat{b}_m \sin(2\pi m f_0(\hat{a}_1^r, \ldots, \hat{a}_P^r)k + \hat{\phi}_m) \right]} \right|$$ (30)

Determine the optimal window size which maximizes the quasi-ML function $$\hat{h} = \underset{h}{\arg\max}\, J(h)$$ (31)

Output corresponding refined phase estimates $\{\hat{a}_p^r\}_{p=1}^{P}$.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An encoder, comprising:
an emitter to emit a waveform to a scene including a structure with a surface varying according to a pattern;
a receiver to receive the waveform reflected from the scene and to measure phases of the received waveform for a period of time;
a memory to store a signal model relating phase measurements of the received waveform with phase parameters, and to store a state model relating the phase parameters with a state of the encoder, wherein the state includes one or combination of a relative velocity of the encoder with respect to the structure and a relative position of the encoder with respect to the structure, wherein the signal model includes a motion-induced polynomial phase signal (PPS) component and a sinusoidal frequency modulated (FM) component, wherein the PPS component is a polynomial function of the phase parameters, and wherein the FM component is a sinusoidal function of the phase parameters;
a processor to determine the phase parameters using non-linear mapping of the phase measurements on the signal model and to determine the state of the encoder by submitting the phase parameters into the state model; and
an output interface to render the state of the encoder.

2. The encoder of claim 1, wherein the non-linear mapping is non-linear regression according to a coupled least squares method.

3. The encoder of claim 1, wherein the processor unwraps the phase measurements of the received waveform, and fits the unwrapped phase measurements on the signal model using a coupled least squares method, according to a coupling function in the phase information between the PPS component and other linear/nonlinear coupled components, such as a sinusoidal FM component.

4. The encoder of claim 1, wherein the processor determines frequencies of the phase measurements, and fits the determined frequencies on the signal model using a coupled least squares method, according to a coupling function in frequency information between the PPS component and other linear/nonlinear coupled components, such as a sinusoidal FM component.

5. The encoder of claim 1, wherein the structure includes a set of uniformly spaced reflectors with a constant inter-reflector spacing forming the pattern, and wherein the memory stores geometrical parameters of the structure.

6. The encoder of claim 1, wherein the structure includes a set of non-uniformly spaced reflectors with varying inter-reflector spacing distances forming the pattern, and wherein the memory stores geometrical parameters of the structure.

7. The encoder of claim 6, wherein the reflectors include rectangular bars, spherical balls or other shapes, such that at least one reflector is used to form the spatial pattern.

8. The encoder of claim 1, wherein the phase parameters are a function of a relative motion of the encoder with respect to the structure, such that the structure includes spaced reflectors along the structure.

9. The encoder of claim 1, wherein a fundamental frequency of the sinusoidal function of the FM component is a coupling function of the polynomial function of the PPS component, wherein the coupling function is a linear function or a non-linear function.

10. A conveying machine method, comprising:
acquiring a reflected waveform for a period of time, by an input interface, wherein the waveform is transmitted from at least one sensor to a structure having reflectors with an inter-reflector spacing varying according to the pattern, and the acquired reflected waveform includes phases to be measured for the period of time;
using a computer readable memory having stored thereon, a signal model relating phase measurements of the received waveform with phase parameters, and a stored state model relating the phase parameters with a state of the conveying machine, wherein the state includes one or combination of a relative velocity of the conveying machine with respect to the structure and a relative position of the conveying machine with respect to the structure, wherein the signal model includes a motion-induced polynomial phase signal (PPS) component and a sinusoidal frequency modulated (FM) component, and the PPS component is a polynomial function of the phase parameters, and the FM component is a sinusoidal function of the phase parameters;
using a processor in communication with the input interface and the computer readable memory, configured to determine the phase parameters using non-linear mapping of the phase measurements on the signal model and to determine the state of the conveying machine by submitting the phase parameters into the state model; and
outputting the state of the conveying machine via an output interface in communication with the processor.

11. The conveying machine method of claim 10, wherein the processor unwraps the phase measurements of the received waveform, and fits the unwrapped phase measurements on the signal model using a coupled least squares method, according to a coupling function in the phase information between the PPS component and other linear/nonlinear coupled components, such as a sinusoidal FM component.

12. The conveying machine method of claim 10, wherein the processor determines frequencies of the phase measurements, and fits the determined frequencies on the signal model using a coupled least squares method, according to a coupling function in frequency information between the PPS component and other linear/nonlinear coupled components, such as a sinusoidal FM component.

13. The conveying machine method of claim 10, wherein the conveying machine includes one of an elevator, a turbine of a conveying transport machine or a helicopter.

14. An elevator system, comprising:
an elevator car to move along a first direction;
a transmitter for transmitting a signal having a waveform, to reflectors located along a structure of the elevator system, such that the reflectors include an inter-reflector spacing varying according to the pattern;
a receiver for receiving the waveform reflected from the reflectors and to measure phases of the received waveform for a period of time, wherein the receiver and the transmitter are arranged such that motion of the elevator car effects the received waveform;
a computer readable memory to store a signal model relating phase measurements of the received waveform with phase parameters, and to store a state model relating the phase parameters with a state of the elevator car, wherein the state includes one or combination of a relative velocity of the elevator car with respect to the structure and a relative position of the elevator car with respect to the structure, wherein the signal model includes a motion-induced polynomial phase signal (PPS) component and a sinusoidal frequency modulated (FM) component, wherein the PPS component is a polynomial function of the phase parameters, and wherein the FM component is a sinusoidal function of the phase parameters;
a processor in communication with the transmitter, the receiver and the computer readable memory, to determine the phase parameters using non-linear mapping of the phase measurements on the signal model and to determine the state of the elevator car by submitting the phase parameters into the state model; and
a controller in communication with the processor, receives the state of the elevator car from the processor, to control an operation of the elevator system using the speed and position of the elevator car and the state of the elevator car, to assist in an operational health management of the elevator system.

15. The elevator system of claim 14, wherein the pattern spacing between any two consecutive reflectors is determined by a signal sampling frequency, a distance between the structure and the elevator car, a size of a reflector, and a beam width of the received reflected waveform.

16. The elevator system of claim 14, wherein the computer readable memory stores the received reflected waveform from the spatially placed reflectors, as a coupled effect due to the relative motion between the elevator car and the spatially placed reflectors, and geometrical parameters of the structure.

17. The elevator system of claim 14, wherein a health state of the reflectors and the structure is inferred from the received waveform obtained from the receiver, such that the receiver is an electromagnetic transceiver.

18. The elevator system of claim 14, further comprising:
a user input is provided on a surface of at least one user input interface and received by the processor, wherein the user input relates to a predetermined threshold time period, a predetermined threshold sinusoidal FM frequency, or both, and the processor processes the user input to solve the hybrid sinusoidal FM-PPS model to produce the speed and position of the elevator car, and the state of the elevator car, to control the operation of the elevator system.

19. The elevator system of claim 14, wherein the receiver or the transmitter, is attached to a shaft or at least one guiderail of the structure of the elevator system, or the transceiver is arranged on the elevator car, such that the reflection of the waveform from the structure, is sensed, wherein the transmitted waveform is different from the received waveform due to the motion of the elevator car.

20. The elevator system of claim 14, wherein the elevator car moves in a dynamic motion in the first direction and measurements of speed are estimated as a polynomial phase signal (PPS) with the PPS phase parameters associated to kinematic parameters of the elevator car, such that an initial velocity and acceleration of the elevator car are proportional to the PPS phase parameters.

* * * * *